United States Patent
Shukla et al.

(10) Patent No.: US 12,002,490 B2
(45) Date of Patent: Jun. 4, 2024

(54) METHOD AND ELECTRONIC DEVICE FOR A SLOW MOTION VIDEO

(71) Applicant: SAMSUNG ELECTRONICS CO., LTD., Suwon-si (KR)

(72) Inventors: Vishwajeet Shukla, Noida (IN); Manisha Meena, Ghaziabad (IN); Mayank Singour, Mandla (IN); Ishan Pandita, Ghaziabad (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 17/853,384

(22) Filed: Jun. 29, 2022

(65) Prior Publication Data
US 2023/0005505 A1    Jan. 5, 2023

Related U.S. Application Data

(63) Continuation of application No. PCT/KR2022/005741, filed on Apr. 21, 2022.

(30) Foreign Application Priority Data

Jun. 30, 2021    (IN) .............................. 202141029538

(51) Int. Cl.
*G06V 20/40*    (2022.01)
*G06V 10/00*    (2022.01)
(Continued)

(52) U.S. Cl.
CPC ............ *G11B 27/005* (2013.01); *G06V 20/41* (2022.01); *G06V 20/49* (2022.01)

(58) Field of Classification Search
CPC ........ G06V 20/40; G06V 10/00; G06V 10/40; G06V 10/70; G06V 10/764; G06V 10/82; G06V 30/00; G11B 27/00
(Continued)

(56) References Cited

U.S. PATENT DOCUMENTS

| | | |
|---|---|---|
| 9,300,906 B2 | 3/2016 | Kokaram et al. |
| 9,560,308 B2 | 1/2017 | Moguillansky |

(Continued)

FOREIGN PATENT DOCUMENTS

| | | |
|---|---|---|
| CN | 104050208 A | 9/2014 |
| CN | 108352174 A | 7/2018 |
| KR | 10-2016-0040711 A | 4/2016 |

OTHER PUBLICATIONS

International Search Report (PCT/ISA/220 and PCT/ISA/210) and Written Opinion (PCT/ISA/237) dated Aug. 8, 2022 by the International Searching Authority in International Application No. PCT/KR2022/005741.

*Primary Examiner* — Daquan Zhao
(74) *Attorney, Agent, or Firm* — Sughrue Mion, PLLC

(57) ABSTRACT

A method for generating a slow motion video. The method includes segmenting, by an electronic device, objects in the video. Further, the method includes determining, by the electronic device, an interaction between the segmented objects. Further, the method includes clustering, by the electronic device, the segmented objects in the video to generate object clusters based on the interaction. Further, the method includes determining, by the electronic device, a degree of slow motion effect to be applied to each of the object clusters in the video based on a significance score of each of the object clusters. Further, the method includes generating, by the electronic device, the slow motion video by applying the degree of slow motion effect to that has been determined to corresponding the object clusters.

20 Claims, 33 Drawing Sheets

(51) Int. Cl.
*G06V 10/40* (2022.01)
*G11B 27/00* (2006.01)
G06V 10/70 (2022.01)
G06V 10/764 (2022.01)
G06V 10/82 (2022.01)
G06V 30/00 (2022.01)

(58) Field of Classification Search
USPC ........ 386/280, 278, 239, 241, 205, 206, 343
See application file for complete search history.

(56) References Cited

U.S. PATENT DOCUMENTS

| | | |
|---|---|---|
| 10,051,206 B2 | 8/2018 | Adsumilli et al. |
| 10,229,324 B2 | 3/2019 | Hwangbo et al. |
| 10,474,903 B2 | 11/2019 | Tandon et al. |
| 10,523,894 B2 | 12/2019 | Keating et al. |
| 11,328,510 B2* | 5/2022 | Nguyen .............. G06F 18/2323 |
| 2014/0205158 A1* | 7/2014 | Fukazawa ............ G06V 40/172 |
| | | 382/118 |
| 2016/0073011 A1 | 3/2016 | Fujita |
| 2018/0035075 A1* | 2/2018 | Lee ........................ H04N 23/62 |
| 2019/0122373 A1 | 4/2019 | Natroshvili et al. |
| 2019/0294881 A1* | 9/2019 | Polak .................... G06V 10/454 |
| 2020/0244884 A1 | 7/2020 | Baek |
| 2021/0056365 A1* | 2/2021 | Sivan ..................... G06V 20/58 |
| 2021/0056998 A1 | 2/2021 | Somanath et al. |

* cited by examiner

METHOD AND ELECTRONIC DEVICE FOR A SLOW MOTION VIDEO

CROSS-REFERENCE TO RELATED APPLICATIONS

This application is a continuation of International Application No. PCT/KR2022/005741 designating the United States, filed on Apr. 21, 2022, in the Korean Intellectual Property Receiving Office and claiming priority to Indian Complete Patent Application No. 202141029538, filed on Jun. 30, 2021 in the Indian Patent Office, the disclosures of all of which are incorporated by reference herein in their entireties.

BACKGROUND

1. Field

The present disclosure relates to image processing techniques, and more specifically to a method and an electronic device for generating multiple sectional slow motion effects in a video.

2. Description of Related Art

A slow motion (SloMo) effect is becoming more and more essential in smartphones, with a recent increase in demand for improvised video clips. A slow motion effect is an image processing technique which is used to make a moving object look virtually moving slower for analyzing minute changes in a motion of the object. Related art slow motion effect techniques record a slow motion video at a uniform frame rate. Due to recording the slow motion video at the uniform frame rate, a slow moving object in the slow motion video will become more slower, whereas the slow motion effect is useful to analyze fast moving objects. Therefore, the uniform frame rate of the slow motion video causes a disadvantage in that a flow of a section of a video frame containing the fast moving object visually pleasing, but the same might not happen for other sections containing the slow moving object. In other words, the slowed fast moving object becomes more visually pleasing while the slowed slow moving object becomes less visually pleasing.

FIG. 1A illustrates a video frame including a car and a human as objects in the video, where the human is walking slowly relative to the car and the car is moving quickly relative to the human. The video of the human and the car is recorded at the uniform frame rate of 480 frames per second (fps) using related art slow motion techniques. Therefore, the motion of the human appears to be relatively stagnant/unmoving in the slow motion video which hinders a cinematic experience of a user and is not desirable. Thus, it would be advantageous to provide a method for generating the slow motion video by resolving the aforementioned disadvantages in related art image processing methods.

SUMMARY

An object of the embodiments herein is to provide a method and an electronic device for generating multiple sectional slow motion effects in a video. The provided method may adaptively apply variable frame rate interpolation in different portions of the video automatically and may introduce a multiple sectional slow motion effect to the video and a cinematographic experience in the video, which improves a visual experience of a user.

Another object of the embodiments herein is to dynamically determine whether a sectional slow motion video recording is to be used for a scene based on a significance score of objects present in the scene.

Another object of the embodiments herein is to replace a moving or still background in video frames with a more cinematically pleasing background at different sectional frame rates for an improved visual experience of the user.

According to an aspect of one or more embodiments, there is provided a method for generating slow motion video. The method includes segmenting, by an electronic device, objects in the video. The method further includes determining, by the electronic device, an interaction between the segmented objects. The method further includes clustering, by the electronic device, the segmented objects in the video to generate object clusters based on the interactions. The method further includes determining, by the electronic device, a degree of slow motion effect to be applied to each of the object clusters in the video based on a significance score of each of the object clusters. The method further includes generating, by the electronic device, the slow motion video by applying the degree of slow motion effect to that has been determined to corresponding the object clusters.

According to another aspect of one or more embodiments, there is provided an electronic device for generating a slow motion video. The electronic device includes a memory, a processor, and a sectional slow motion controller, coupled to the memory and the processor. The sectional slow motion controller is configured to perform operations comprising segmenting objects in the video, determining an interaction between the segmented objects, clustering the segmented objects in the video to generate object clusters based on the interaction, determining a degree of slow motion effect to be applied to each of the object clusters in the video based on a significance score of each of the object clusters, generating the slow motion video by applying the degree of slow motion effect that has been determined to corresponding the object clusters.

In an embodiment, wherein the segmenting of the objects comprises determining a class confidence score of each video frame of the video using a Machine Learning (ML) model, the class confidence score being a quantitative measurement of a quality of content in the video frame, filtering the video frames based on the class confidence scores, identifying by the electronic device (100) the objects in the filtered video frames, estimating a depth score of each of the identified objects in the filtered video frames based on depth information in the filtered video frames, determining an optical flow rate of each of the identified objects in the filtered video frames, the optical flow rate being a quantitative measurement of a velocity of movement of pixels corresponding to the identified objects in the filtered video frames and generating the segmented objects from the filtered video frames by applying the optical flow rate and the depth score of each identified object to a semantic segmentation network.

In an embodiment, wherein the determining of the interaction comprises determining the interaction between the segmented objects for a time duration by applying the optical flow rate and the depth score of each of the segmented objects to a memory based neural network.

In an embodiment, wherein the determining of the degree of slow motion effect comprises determining the significance score of each of the object clusters, the significance score being a measure of a relative importance of each of the object clusters in the video and the determining the degree of slow motion effect for each of the objects based on the corresponding the significance score for the object clusters.

In an embodiment, wherein the determining of the significance score comprises determining a cluster flow rate ($\alpha$) of each of the object clusters based on an optical flow rate of each segmented object in the corresponding object clusters, generating a hash table of a proximity change coefficient ($\beta$) based on the change in clustering of the segmented objects at the different instants of time in the video, the proximity change coefficient ($\beta$) being a number of times that the segmented object changes into and out of the object clusters within a time duration, and determining the significance score of each of the object clusters based on based on at least one of the cluster flow rate ($\alpha$) and the proximity change coefficient ($\beta$).

In an embodiment, wherein the determining of the significance score comprises estimating, by the electronic device (100), a rigidness score of each of the segmented objects based on at least one of a relative frequency of the segmented objects occurring in the video, a perceptual aesthetic quality of the segmented objects and a degree of movement of the segmented objects based on the object classes of the segmented objects, the rigidness score being a measure of static aspects of an affinity for slow motion of the segmented object, and determining the significance score of each of the object clusters based on the rigidness score.

In an embodiment, wherein the generating of the slow motion video comprises determining an interpolation rate for each of a plurality of sections in the video frames that correspond to the object clusters, based on the significance score of the object cluster corresponding to the section and interpolating the object clusters in each video frame based on the interpolation rate of the corresponding sections.

In an embodiment, wherein the determining of the interaction comprises categorizing the segmented objects to one of an interacting class in response to determining the interaction between the segmented objects, and a non-interacting class in response to not determining the interaction between the segmented objects.

In an embodiment, the memory based neural network outputs a probability score indicating whether the segmented objects are interacting.

In an embodiment, the rigidness score is estimated using a weighted combination of (a) the relative frequency of the segmented objects occurring in the video, (b) the perceptual aesthetic quality of the segmented objects, and (c) the degree of movement of the segmented objects based on the object classes of the segmented objects, weights thereof being determined using regression analysis.

In an embodiment, (b) the perceptual aesthetic quality of the segmented objects is determined as a probability using a neural network that is trained on a dataset of images labeled with a score of aesthetic values between 0 and 1.

According to another aspect of one or more embodiments, there is provided a computer-readable storage medium, having a computer program stored thereon that performs, when executed by a processor, the above method.

BRIEF DESCRIPTION OF THE DRAWINGS

The embodiments herein will be better understood from the following description with reference to the drawings, in which.

DETAILED DESCRIPTION

Figure 1A:
FIG. 1A illustrates a video frame of a video that includes a car and a human as objects in the video, according to the related art.

The above and other objects of the embodiments herein will be better appreciated and understood when considered in conjunction with the description and the accompanying drawings. It should be understood, however, that the following descriptions, while indicating various embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may, in some cases, be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms "first", "second", etc. may be used herein to describe various elements, these elements should not be limited by these terms. These terms are generally only used to distinguish one element from another. In the accompanying drawings, like reference letters indicate corresponding parts in the various figures.

Various embodiments disclosed herein provide a method for generating multiple sectional slow motion effects in a video. In other words, different sections of a same video may have different slow motion effects occurring at the same time. The method includes segmenting, by an electronic device, objects in the video. Further, the method includes determining, by the electronic device, an interaction between the segmented objects. Further, the method includes determining, by the electronic device, a degree of slow motion effect used for each segmented object in the video based on the interaction between the segmented objects and at least one parameter associated with an importance of a scene in the video. Further, the method includes generating, by the electronic device, a slow motion video by applying the determined degree of slow motion effect to corresponding segmented object. Further, the method includes storing, by the electronic device, the slow motion video.

Figure 1B:
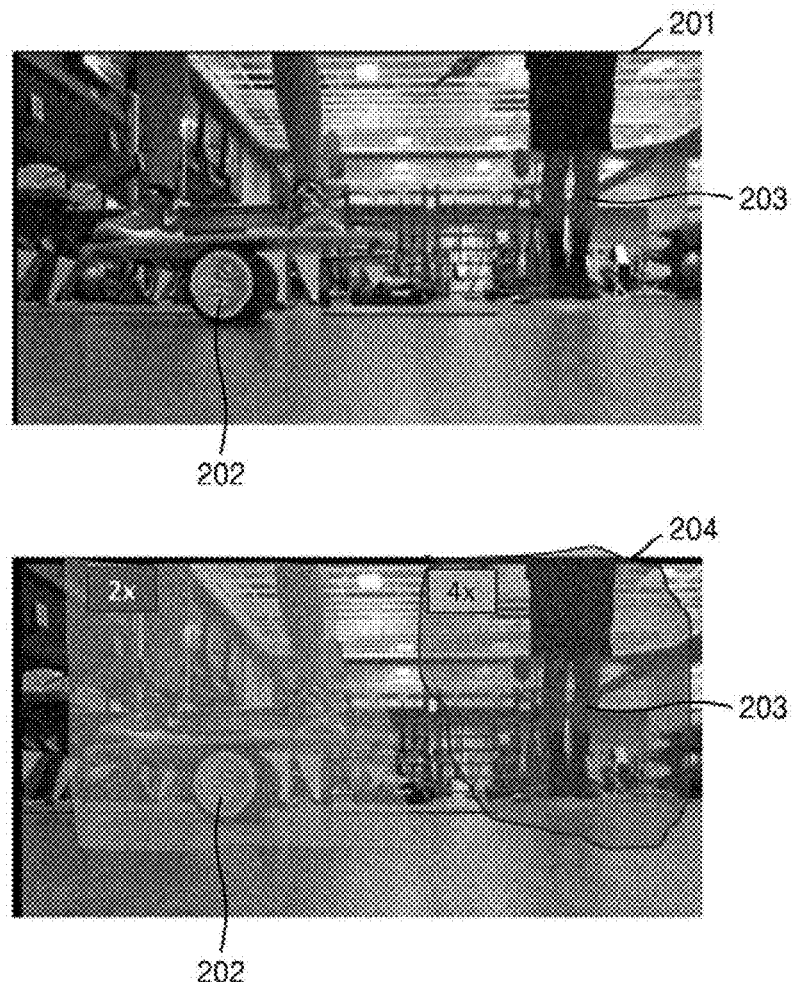
FIG. 1B illustrates a comparison of a slow motion video created using an related art method and a method according to an embodiment.

FIG. 1B illustrates a comparison of a slow motion video created using a related art method and a method according to an embodiment. As shown in (201), consider a scene of two boys, one on a skateboard and one jumping rope, where, in the scene, a motion of the first boy on the skateboard (202) is slower than a motion of a second boy jumping rope (203). If a slow motion video of the scene is recorded using the related art method, every object (i.e., the boys, the skateboard, the jump rope) in the scene (201) are recorded in slow motion at a same video frame interpolation rate, and hence a cinematic effect will be missing in the slow motion recording of the scene. By contrast, as shown in (204), unlike related art methods and systems, the method according to an embodiment adaptively applies a variable frame rate interpolation (e.g. 2× and 4×) in different portions (i.e. a portion 202 of the boy on the skateboard, a portion 203 of the boy jumping rope) of the video automatically and introduces a sectional slow motion effect and a cinematographic effect in the video, which improves a visual experience of a user in watching the slow motion video.

Unlike related art methods and systems, the method according to an embodiment may be used to dynamically determine whether a sectional slow motion video recording is to be used for a scene based on a significance score of objects present in the scene. Therefore, no user intervention is required for triggering recording of the sectional slow motion video which improves the visual experience of the videos.

Unlike related art methods and systems, the method according to an embodiment may be used to replace a moving or still background in video frames with a more cinematically pleasing background at different sectional frame rates for an improved visual experience of the user in watching the slow motion videos.

Referring now to the drawings, and more particularly to FIGS. 2A through 19, there are shown various embodiments.

Figure 2A:
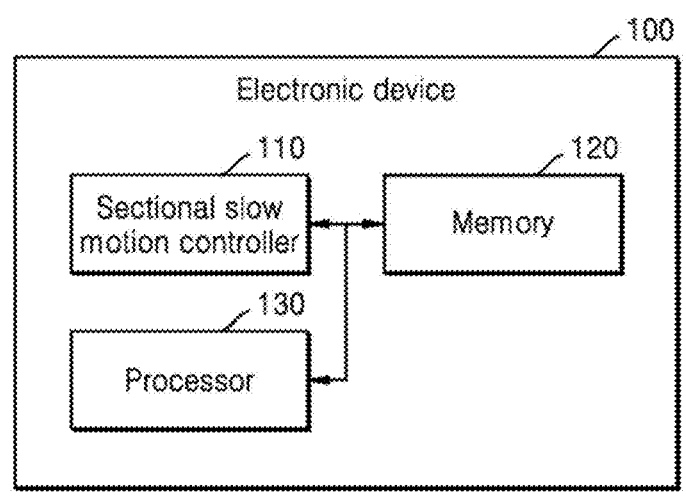
FIG. 2A is a block diagram of an electronic device for generating multiple sectional slow motion effects in a video, according to an embodiment.

FIG. 2A is a block diagram of an electronic device (100) for generating multiple sectional slow motion effects in a video, according to an embodiment. Examples of the electronic device (100) include, but are not limited to a smart phone, a tablet computer, a personal digital assistance (PDA), a desktop computer, an camera device, a wearable device, a multimedia device, etc. In an embodiment, the electronic device (100) may include a sectional slow motion controller (110), a memory (120), and a processor (130).

Figure 2B:
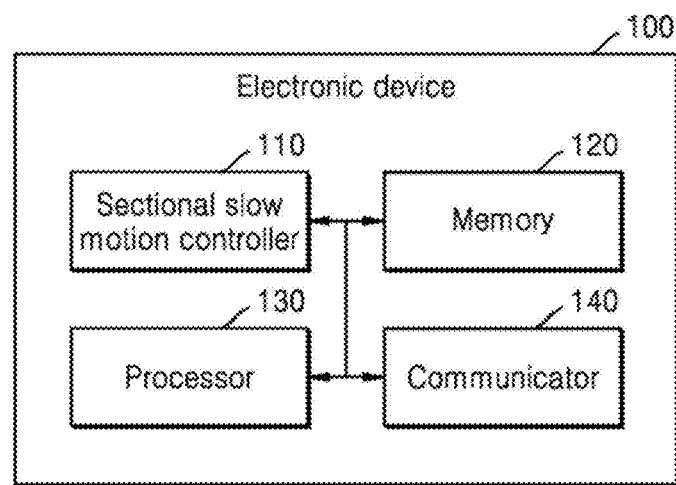
FIG. 2B is a block diagram of an electronic device for generating multiple sectional slow motion effects in a video, according to an embodiment.

FIG. 2B is a block diagram of an electronic device (100) for generating multiple sectional slow motion effects in a video, according to an embodiment. In an embodiment, the electronic device (100) may include the sectional slow motion controller (110), the memory (120), the processor (130), a communicator (140).

In some embodiments, the sectional slow motion controller (110), the memory (120), and the processor (130), and the communicator (140) may be communicatively connected by a bus. In another embodiment, the electronic device (100) may include the sectional slow motion controller (110), the memory (120), the processor (130), the communicator (140), and a multi-camera module (150), where the multi-camera module (150) may include a normal angle camera and a wide angle camera. In some embodiments, the sectional slow motion controller (110), the memory (120), the processor (130), the communicator (140) and the multi-camera module (150) may be communicatively connected by the bus.

The sectional slow motion controller (110) may be implemented by processing circuitry such as logic gates, integrated circuits, microprocessors, microcontrollers, memory circuits, passive electronic components, active electronic components, optical components, hardwired circuits, and/or the like, and may in some cases be driven by firmware. The circuits may, for example, be embodied in one or more semiconductor chips, or on substrate supports such as printed circuit boards and the like.

The sectional slow motion controller (110) is configured to receive a video. In an embodiment, the video may be a live video obtaining from a camera sensor or the multi-camera module or from an external server. In another embodiment, the video may be a recorded video obtained from the memory (120) or the external server. The sectional slow motion controller (110) is configured to segment objects in the video. In an embodiment, the sectional slow motion controller (110) is configured to decode the video and obtain video frames from the video. Further, the sectional slow motion controller (110) is configured to determine a class confidence score of each video frame using a Machine Learning (ML) model (e.g., one or more pre-trained convolution neural networks (CNNs)) by taking the video frames as an input, and outputting a probability with which the electronic device (100) is able to detect and discriminate the objects in the video frames. The probability corresponds to the class confidence score. The class confidence score may be a quantitative measurement of a quality of content in the video frame.

The sectional slow motion controller (110) is configured filter the video frames with clear visibility (i.e., video frames that have discernable objects) from the video based on the class confidence score. The sectional slow motion controller (110) is configured to identify the objects in the filtered video frames. The sectional slow motion controller (110) is configured calculate depth information of each object in the filtered video frames, based on the video data of the video frames, and to estimate a depth score of each object from the filtered video frames based on the depth information of each object in the filtered video frames. The sectional slow motion controller (110) is configured to determine an optical flow rate of each object from the filtered video frames, where the optical flow rate of each object is a quantitative measurement of a velocity of movement of pixels corresponding to the object in the video. The sectional slow motion controller (110) is configured to generate the segmented object from the filtered video frames by applying the optical flow rate and the depth score of each object to a semantic segmentation network.

The sectional slow motion controller (110) is configured to determine an interaction between the segmented objects. In an embodiment, the sectional slow motion controller (110) is configured to determine the interaction between the segmented objects for a time duration by applying the optical flow rate of each segmented object from the filtered video frames and the depth score of each segmented object to a memory based neural network (e.g., Long Short-Term Memory cells (LSTM)).

The sectional slow motion controller (110) is configured to determine a degree (i.e., an amount) of slow motion effect to be used for each segmented object in the video based on the interaction between the segmented objects and at least one parameter associated with an importance of a scene in the video. In an embodiment, the sectional slow motion controller (110) is configured to cluster the segmented objects in each video frame of the video to form object clusters based on the interaction between the segmented objects. The sectional slow motion controller (110) is configured to determine a significance score of each object cluster based on a change in clustering of the segmented objects at different instants of time in the video and based on the at least one parameter, where the significance score of each object cluster is a measure of relative importance assigned to each object cluster in the video. The sectional slow motion controller (110) is configured to interpolate each object cluster based on the significance score of each object cluster to apply the determined degree of slow motion effect to the corresponding segmented object.

In an embodiment, the sectional slow motion controller (110) is configured to determine a cluster flow rate ($\alpha$), where the cluster flow rate is an average optical flow rate of each segmented object in the object cluster. The at least one parameter may include the cluster flow rate ($\alpha$). The sectional slow motion controller (110) is configured to generate a hash table of a proximity change coefficient ($\beta$) using the change in clustering of the segmented objects at different instants of time in the video, where the proximity change coefficient is the number of times a segmented object changes from the object cluster within a time duration. The at least one parameter may include the proximity change coefficient ($\beta$). The sectional slow motion controller (110) is configured to estimate a rigidness score of the segmented object based on one or more of (a) a relative frequency of the segmented object occurring in the video and (b) a perceptual aesthetic quality of the video frame, where the rigidness score of the segmented object is a measure of static aspects of segmented object's affinity for slow motion. The sectional slow motion controller (110) is configured to determine the significance score of each object cluster based on the rigidness score, and based on the cluster flow rate ($\alpha$) and/or the proximity change coefficient ($\beta$) of the segmented objects included in the object cluster.

The sectional slow motion controller (110) is configured to determine a degree of slow motion effect corresponding to each object cluster based on the significance score of the object cluster, and to generate a slow motion video by applying the determined degree of slow motion effect to corresponding segmented objects of the object cluster. In an embodiment, the sectional slow motion controller (110) is configured to determine an interpolation rate of each section in the video frames based on the significance score of the object cluster in the section. The interpolation rate of each section in the video frames is called a sectional interpolation rate. The sectional slow motion controller (110) is configured to interpolate the object cluster in each video frame based on the interpolation rate. Further, the sectional slow motion controller (110) is configured to store the slow motion video.

Clustering helps to group the objects together which are very frequently interacting in the video. Clustering helps to reduce inconsistency in the video. Clustering ensures a region in the video that has groups of objects which are frequently interacting will be slow motioned at a same rate. Clustering may be used to set a boundary on video where a slow motion effect is to be used.

The memory (120) may store the slow motion video with multiple sectional slow motion effects as described above, a video with uniform frame rate, the hash table, a class confidence score threshold, and a wide angle video. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) may be configured to store larger amounts of information than a storage space provided in the memory (120). In certain examples, a non-transitory storage medium may store data that may, over time, change (e.g., in Random Access Memory (RAM) or cache). The memory (120) may be an internal storage or the memory (120) may be an external storage of the electronic device (100), a cloud storage, or any other type of external storage.

The processor (130) is configured to access and execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions.

The communicator (140) is configured to communicate internally between hardware components in the electronic device (100). Further, the communicator (140) is configured to facilitate the communication between the electronic device (100) and other devices via one or more networks (e.g. Radio technology). The communicator (140) includes an electronic circuit specific to a standard that enables wired or wireless communication.

At least one of the various functions of the sectional slow motion controller (110) described above may be implemented through a machine learning (ML) model. A function associated with the ML model may be performed through the memory (120) and the processor (130), for example by the non-volatile memory, the volatile memory, and the processor (130).

The processor (130) may include one or a plurality of processors. The one or more processors may be a general purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU).

The one or a plurality of processors control the processing of the input data in accordance with a predefined operating rule or ML model stored in the memory (120), e.g., the non-volatile memory and the volatile memory. The predefined operating rule or artificial intelligence model is provided through training or learning.

Here, being provided through learning denotes that, by applying a learning technique to a plurality of learning data, a predefined operating rule or ML model of a desired characteristic is made. The learning may be performed in a device itself in which the ML model according to an embodiment is performed, and/or may be implemented through a separate server/system.

The ML model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), attention based network, deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

Although the FIG. 2A shows the hardware components of the electronic device (100), it is to be understood that other embodiments are not limited thereon. In other embodiments, the electronic device (100) may include fewer or more number of components. Further, the labels or names of the components are used only for illustrative purpose and do not limit the scope of the disclosure. One or more components may be combined together to perform a same or substantially similar function for generating the multiple sectional slow motion effects in the video.

Figure 2C:
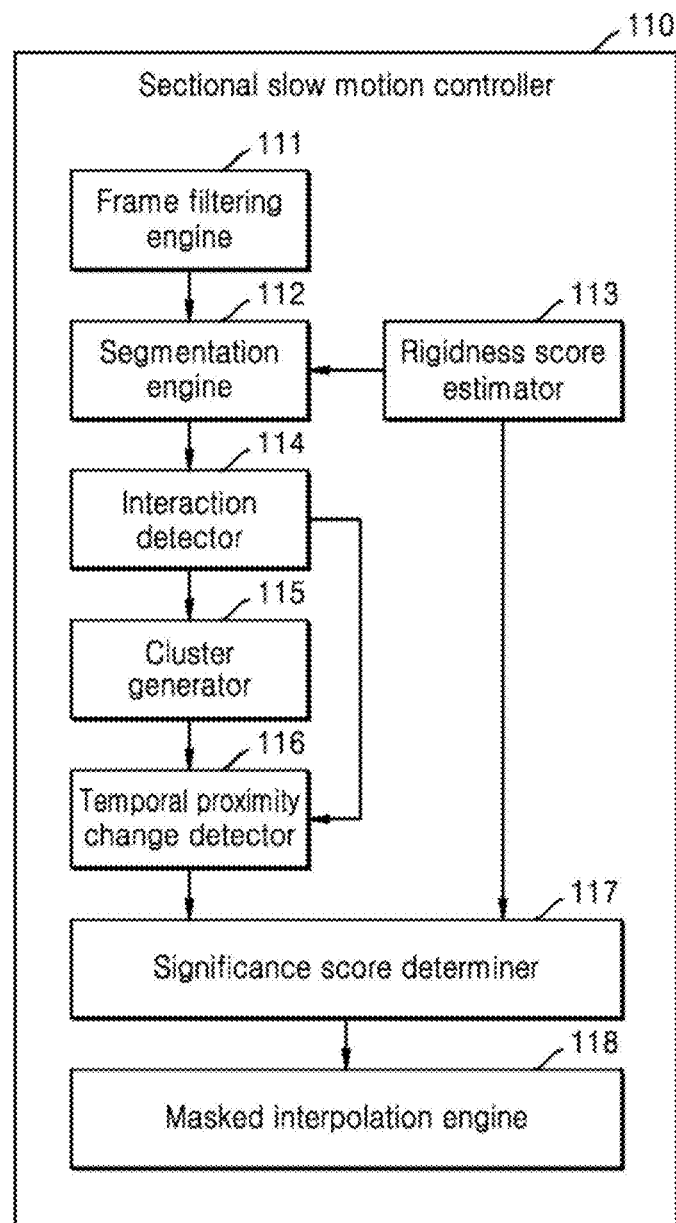
FIG. 2C is a block diagram of a sectional slow motion controller of the electronic device for generating a slow motion video by applying different degree of slow motion effect to different objects in the video, according to an embodiment.

FIG. 2C is a block diagram of the sectional slow motion controller (110) of the electronic device (100) for generating the slow motion video by applying different degree of slow motion effect to different objects in the video, according to an embodiment. In an embodiment, the sectional slow motion controller (110) may include a frame filtering engine (111), a segmentation engine (112), a rigidness score estimator (113), an interaction detector (114), a cluster generator (115), a temporal proximity change detector (116), a significance score determiner (117), and a masked interpolation engine (118).

The frame filtering engine (111), the segmentation engine (112), the rigidness score estimator (113), the interaction detector (114), the cluster generator (115), the temporal proximity change detector (116), the significance score determiner (117), and the masked interpolation engine (118) are implemented by processing circuitry such as logic gates, integrated circuits, microprocessors, microcontrollers, memory circuits, passive electronic components, active electronic components, optical components, hardwired circuits, or the like, and may, in some cases, be driven by firmware. The circuits may, for example, be embodied in one or more semiconductor chips, or on substrate supports such as printed circuit boards and the like.

The frame filtering engine (111) receives the video and obtains the video frames by decoding the video. The segmentation engine (112) segments the objects in the video. In an embodiment, the frame filtering engine (111) determines the class confidence score of each video frame using a class confidence ML model. The frame filtering engine (111) filters the video frames with clear visibility (i.e., video frames that have discernable objects) from the video based on the class confidence score. The frame filtering engine (111) identifies the objects in the filtered video frames. The frame filtering engine (111) calculates depth information for each object in the filtered video frames, based on the video data of the video frames, and estimates the depth score of each object from the filtered video frames based on the depth information of each object in the filtered video frames. The frame filtering engine (111) determines the optical flow rate of each object from the filtered video frames, where the optical flow rate of each object is a quantitative measurement of a velocity of movement of pixels corresponding to the object in the video. The segmentation engine (112) generates the segmented object from the filtered video frames by applying the optical flow rate and the depth score of each object to the semantic segmentation network.

The interaction detector (114) determines an interaction between the segmented objects. In an embodiment, the interaction detector (114) determines the interaction between the segmented objects for a time duration by applying the optical flow rate of each segmented object from the filtered video frames and the depth score of each segmented object to a memory based neural network.

The significance score determiner (117) determines the degree of slow motion effect to be used for each segmented object in the video based on the interaction between the segmented objects and at least one parameter associated with the scene importance in the video. In an embodiment, the cluster generator (115) clusters the segmented objects in each video frame of the video to form the object clusters based on the interaction between the segmented objects. The significance score determiner (117) determines the significance score of each object cluster based on the change in clustering of the segmented objects at the different instants of time in the video and based on the at least one parameter. The masked interpolation engine (118) interpolates each object cluster based on the significance score of each object cluster to apply the determined degree of slow motion effect to the corresponding segmented object.

In an embodiment, the temporal proximity change detector (116) determines the cluster flow rate ($\alpha$). The temporal proximity change detector (116) receives an indication on whether two objects or object clusters in the video are interacting or not. Further, the temporal proximity change detector (116) generates the hash table of the proximity change coefficient ($\beta$) using the change in clustering of the segmented objects at different instants of time in the video. In another embodiment, the cluster generator (115) determines the cluster flow rate ($\alpha$) from the object clusters and provides the cluster flow rate ($\alpha$) to the temporal proximity change detector (116) for generating the hash table. The cluster flow rate ($\alpha$) for the object cluster i, with J objects in the object cluster at any timestamp is determined using the equation 1:

$$\text{Cluster flow rate } (\alpha) = \frac{\sum_{j=1}^{J} \text{Flow rate } Obj}{j} \quad (1)$$

where, flow rate Obj is the optical flow rate. The cluster flow rate ($\alpha$) may be determined for K number of object clusters in the video frame.

Since a fast moving object has a higher tendency towards slow motion effect generation, hence increasing the cluster flow rate would normally refer to an increase in the slow motion effect. For example, a car moving at 100 miles per hour would be slow motioned at 8×, while a bicycle moving at 20 miles per hour would be slow motioned at 2×.

The cluster flow rate ($\alpha$) (or a cluster speed) denotes the average of a motion magnitude of different objects in the object cluster. A slow motion factor may be nonlinear directly proportional to the cluster flow rate ($\alpha$). The slow motion factor may also be called a slow motion rate which is a degree of slow motion effect or a quantitative measure of a magnitude of the slow motion effect. The terms "slow motion factor" and "slow motion rate" are interchangeably used and are related to the object's affinity for slow motion. The cluster flow rate ($\alpha$) is calculated by averaging an optical flow of all the objects present in the object cluster. A fast moving object cluster has more affinity for the slow motion. For example, a man moving on a bike will have a higher slow motion rate as compared to a man running with a slower speed. Depending on the situation or the video frame of reference of recording the video, the cluster flow rate ($\alpha$) may be different for a same object. In an example, a car is moving and a person is sitting inside the car. Consider, the person records the video of outside environment while moving along with the car. Now, everything in the outside environment appears to move backward for the person. Consider, a man is standing in a ground in the outside environment, but the man will appear to move along with the ground for the person inside the car. So, the value of the cluster flow rate ($\alpha$) is the magnitude of a backward motion. The backward motion a relative motion of outside objects (not in the car from which the video is recorded). So all the objects outside the car will appear to move backward with respect to an object moving forward.

If two objects are in close interaction, there is a problem in that it is difficult to find a different slow motion rate for each object, which introduces inconsistency. In order to address this problem, the temporal proximity change detector (116) monitors the motion of objects grouped in clusters of close interaction. With reference to video frames 705-707 in FIG. 7B, consider, $\alpha 1$ is the optical flow of the ball, $\alpha 2$ is the optical flow of the human in each case, $\alpha 3$ is optical flow of the goal post. In the video frame 705, the ball and the human are in close interaction, where the ball and the human are grouped together in an object cluster (see yellow). Therefore, the temporal proximity change detector (116) determines the cluster flow rate ($\alpha$) of the object cluster as ($\alpha 1+\alpha 2$)/2.

In the video frame 706, the ball and the human are each in a separate object cluster, where there are two clusters corresponding to the ball (red) and the human (green). Therefore, the temporal proximity change detector (116) determines the cluster flow rate ($\alpha$) corresponding to the ball cluster as $\alpha 1$, and the cluster flow rate ($\alpha$) corresponding to the human cluster as $\alpha 2$. In the video frame 707, the ball and goalpost are in close interaction, wherein the ball and the goalpost are grouped together in a single object cluster (green), where there are two object clusters corresponding to the ball and goalpost (green), and human (yellow). Therefore, the temporal proximity change detector (116)) determines the cluster flow rate ($\alpha$) corresponding to the cluster containing the ball and goalpost as α1+α3/2, and the cluster flow rate (α) corresponding to cluster containing the human as α2.

In some embodiments, the proximity change coefficient (β) may denote the number of times the object interacts with different objects or object clusters. For example, in FIG. 7B, the ball interacts with different objects or a collection of objects (e.g., with the human in (705), with the goalpost in (707), etc.) or the object clusters. In other embodiments, the proximity change coefficient (β) may denote the number of times the object changes cluster. The slow motion factor is nonlinear directly proportional to the proximity change coefficient (β). The proximity change coefficient (β) is calculated by monitoring the change of the object cluster in the hash table. Consider, a man is jumping from a horse while playing Soccer ball, where the man changes cluster several times.

When a human kicks the ball towards goalpost, then the ball changes cluster several times, etc. The proximity change coefficient (β) accounts for effect of the motion, specifically the number of times the cluster of the object changes due to its own motion or a motion of other objects. The proximity change coefficient (β) provides an importance of the motion of the object. A greater number of changes of the object cluster denotes that the object is more important and in turn contributes more towards the slow motion rate. The proximity change coefficient (β) may be used by the temporal proximity change detector (116) to decide whether the object is of central importance in the video.

Returning to FIG. 2C, the rigidness score estimator (113) estimates the rigidness score of the segmented object based on one or more of (a) the relative frequency of the segmented object occurring the video and (b) the perceptual aesthetic quality of the video frame. The significance score determiner (117) determines the significance score of each object cluster based on the rigidness score, and based on the cluster flow rate (α) and/or the proximity change coefficient (β), of the segmented objects included in the object cluster.

The masked interpolation engine (118) determines a degree of slow motion effect corresponding to each object cluster based on the significance score of the object cluster, and generates the slow motion video by applying the determined degree of slow motion effect to corresponding segmented objects in the object cluster. In an embodiment, the masked interpolation engine (118) determines the interpolation rate of each section in the video frames based on the significance score of the object cluster in the section. The masked interpolation engine (118) interpolates the object cluster in each video frame based on the interpolation rate.

Although the FIG. 2C shows the hardware components of the sectional slow motion controller (110), it is to be understood that other embodiments are not limited thereon. In other embodiments, the sectional slow motion controller (110) may include fewer or more components. Further, the labels or names of the components are used only for illustrative purposes and do not limit the scope of the disclosure. One or more components may be combined together to perform a same or substantially similar function for generating the slow motion video by applying a different degree of slow motion effect to different objects in the video.

Figure 3:
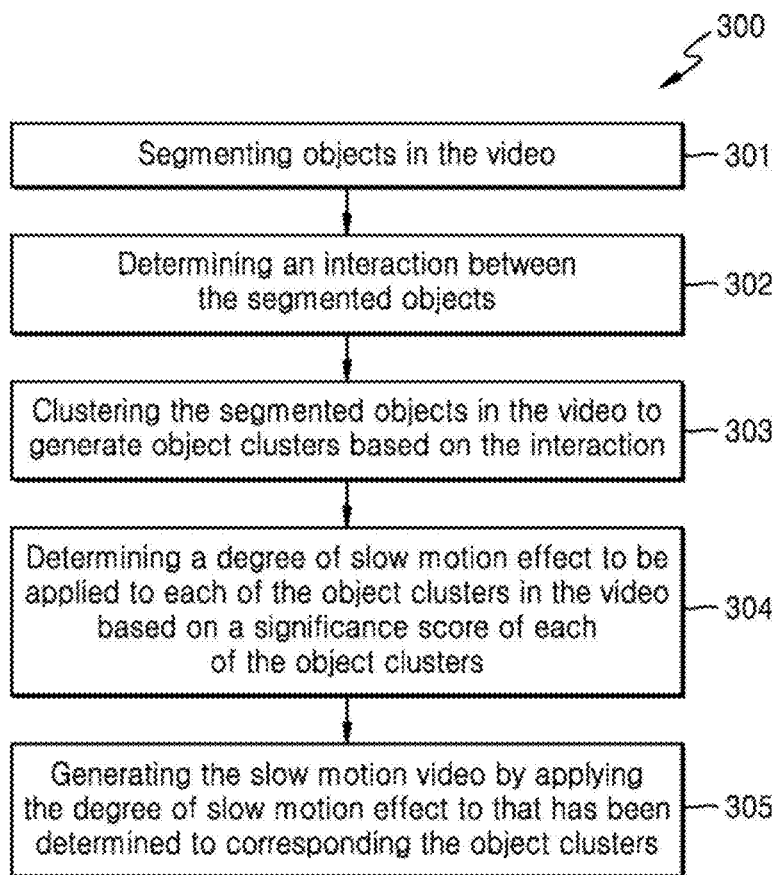
FIG. 3 is a flow diagram illustrating a method for generating the multiple sectional slow motion effects in the video, according to an embodiment.

FIG. 3 is a flow diagram 300 illustrating a method for generating the multiple sectional slow motion effects in the video, according to an embodiment. At step 301, the method includes segmenting the objects in the video. In an embodiment, the segmentation engine (112) segments the objects in the video. Segmentation engine (112) is configured to determine a class confidence score of each video frame of the video using a Machine Learning (ML) model, the class confidence score being a quantitative measurement of a quality of content in the video frame. Segmentation engine (112) is further configured to filter the video frames based on the class confidence scores. Segmentation engine (112) is further configured to identify by the electronic device (100) the objects in the filtered video frames. Segmentation engine (112) is further configured to estimate a depth score of each of the identified objects in the filtered video frames based on depth information in the filtered video frames. Segmentation engine (112) is further configured to determine an optical flow rate of each of the identified objects in the filtered video frames, the optical flow rate being a quantitative measurement of a velocity of movement of pixels corresponding to the identified objects in the filtered video frames. Segmentation engine (112) is further configured to generate the segmented objects from the filtered video frames by applying the optical flow rate and the depth score of each identified object to a semantic segmentation network.

At step 302, the method includes determining an interaction between the segmented objects. In an embodiment, the interaction detector (114) determines the interaction between the segmented objects. Interaction detector (114) is further configured to determine the interaction between the segmented objects for a time duration by applying the optical flow rate and the depth score of each of the segmented objects to a memory based neural network. In an embodiment, the determining of the interaction comprises categorizing the segmented objects to one of an interacting class in response to determining the interaction between the segmented objects, and a non-interacting class in response to not determining the interaction between the segmented objects. The memory based neural network may output a probability score indicating whether the segmented objects are interacting.

At step 303, the method includes clustering the segmented objects in the video to generate object clusters based on the interaction. Cluster generator (115) is further configured to cluster the segmented objects in the video to generate object clusters based on the interaction At step 304, the method includes determining a degree of slow motion effect to be applied to each of the object clusters in the video based on a significance score of each of the object clusters. Wherein, the determining of the degree of slow motion effect may comprise determining a degree of slow motion effect to be used for clusters of objects in the video based on the interaction between the segmented objects and at least one parameter associated with the importance of the scene in the video.

In an embodiment, the significance score determiner (117) determines a degree of slow motion effect to be applied to each of the object clusters in the video based on a significance score of each of the object clusters. In an embodiment, the significance score determiner (117) is configured to determine the significance score of each of the object clusters. The significance score determiner (117) is further configured to determine the degree of slow motion effect for each of the objects based on the corresponding the significance score for the object clusters. The significance score may be a measure of a relative importance of each of the object clusters in the video.

In an embodiment, the determining of the significance score comprises determining a cluster flow rate (α) of each of the object clusters based on an optical flow rate of each segmented object in the corresponding object clusters, generating a hash table of a proximity change coefficient (β) based on the change in clustering of the segmented objects at the different instants of time in the video, the proximity change coefficient (β) being a number of times that the segmented object changes into and out of the object clusters within a time duration, and determining the significance score of each of the object clusters based on based on at least one of the cluster flow rate (α) and the proximity change coefficient (β).

In an embodiment, the determining of the significance score comprises estimating, by the electronic device (100), a rigidness score of each of the segmented objects based on at least one of (a) a relative frequency of the segmented objects occurring in the video, (b) a perceptual aesthetic quality of the segmented objects and (c) a degree of movement of the segmented objects based on the object classes of the segmented objects, the rigidness score being a measure of static aspects of an affinity for slow motion of the segmented object, and determining the significance score of each of the object clusters based on the rigidness score. The rigidness score may be estimated using a weighted combination of (a) the relative frequency of the segmented objects occurring in the video, (b) the perceptual aesthetic quality of the segmented objects and (c) the degree of movement of the segmented objects based on the object classes of the segmented objects, weights thereof being determined using regression analysis. The perceptual aesthetic quality of the segmented objects may be determined as a probability using a neural network that is trained on a dataset of images labeled with a score of aesthetic values between 0 and 1.

At step 305, the method includes generating the slow motion video by applying the degree of slow motion effect to that has been determined to corresponding the object clusters. In an embodiment, the masked interpolation engine (118) generates the slow motion video by applying the degree of slow motion effect to that has been determined to corresponding the object clusters. The method may further include storing the slow motion video. In an embodiment, the memory (120) stores the slow motion video.

In an embodiment, masked interpolation engine (118) is configured to determine an interpolation rate for each of a plurality of sections in the video frames that correspond to the object clusters, based on the significance score of the object cluster corresponding to the section, and to interpolate the object clusters in each video frame based on the interpolation rate of the corresponding sections.

The various actions, acts, blocks, steps, or the like in the flow diagram 300 may be performed by the processor (130) in the order presented, in a different order or simultaneously. Further, in some embodiments, some of the actions, acts, blocks, steps, or the like may be omitted, added, modified, skipped, or the like without departing from the scope of the invention.

Figure 4:
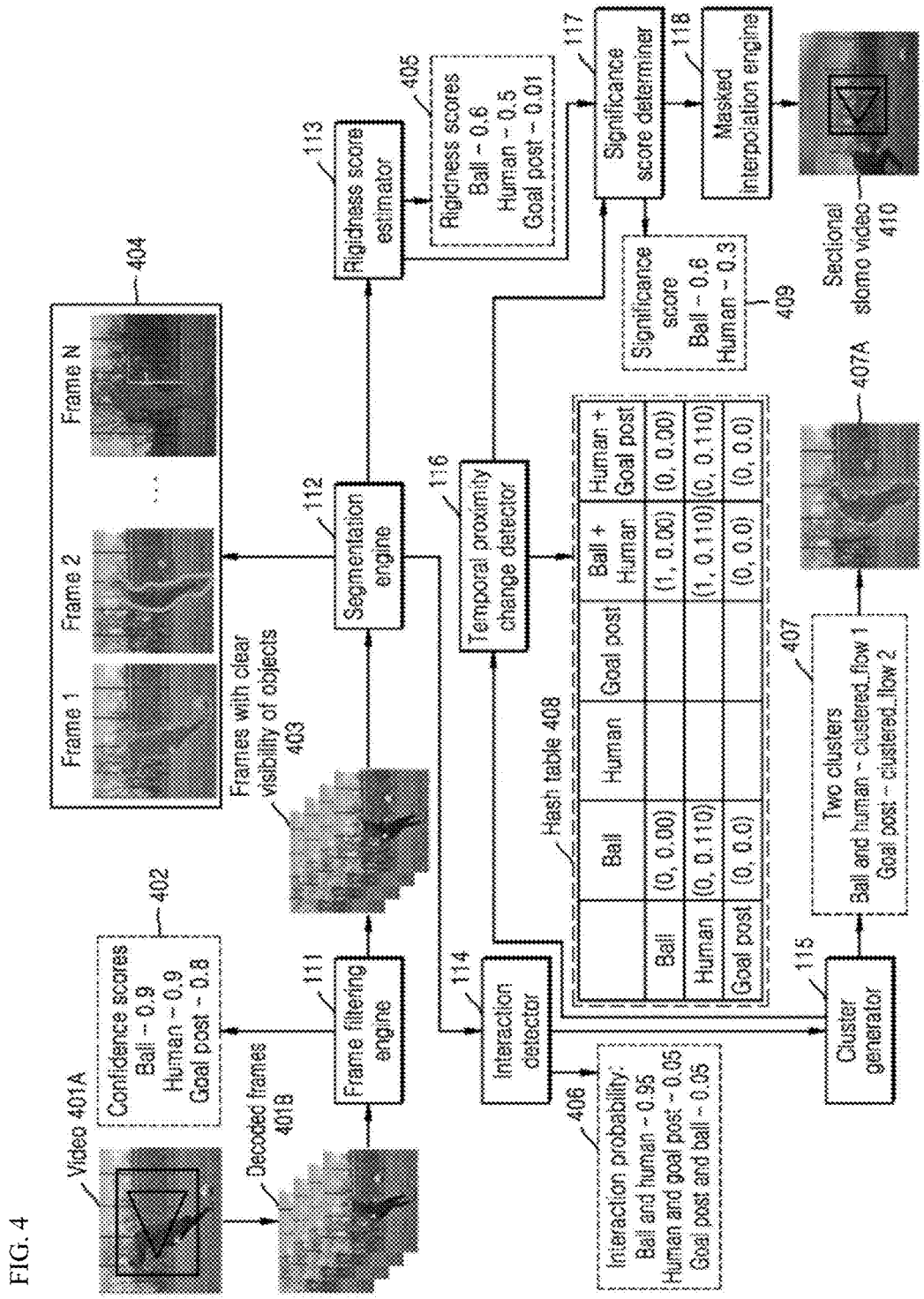
FIG. 4 illustrates an example scenario of generating the multiple sectional slow motion effects in the video, according to an embodiment.

FIG. 4 illustrates an example scenario of generating the multiple sectional slow motion effects in the video, according to an embodiment. At 401A, the filter frame engine (111) receives the video (e.g. a human kicking a ball to a goalpost) from the memory (120). At 401B, the filter frame engine (111) decodes the video frames in the video. At 402, the filter frame engine (111) determines the class confidence score of each video frame in the video. In an embodiment, the filter frame engine (111) determines the class confidence score of each video frame by adding a class confidence score of each object in the video frame. In the example, the class confidence scores of the ball, the human and the goalpost, are 0.9, 0.9, and 0.8 respectively. The filter frame engine (111) matches the class confidence score of each video frame with a class confidence score threshold for filtering the video frames. At 403, the filter frame engine (111) chooses the video frames with a class confidence score that is greater than the class confidence score threshold as the video frames with clear visibility of the objects.

The video frames filtered from the filter frame engine (111) are further processed by the segmentation engine (112). The segmentation engine (112) identifies the objects in the video frame. At 404, the segmentation engine (112) segments the objects in each video frame (i.e., frame 1 to frame n) by applying the optical flow rate and the depth score of each object to the semantic segmentation network, where each pixel in the video frame is assigned to an object category to which the pixel belongs. In another embodiment, the segmentation engine (112) segments the objects in each video frame. At 405, the rigidness score estimator (113) analyses the segmented objects in the video frames and determines the rigidness score of the objects. In the example, the rigidness scores of the ball, the human and the goalpost are 0.6, 0.5, and 0.01 respectively.

At 406, the interaction detector (114) determines the interaction between the segmented objects in the video frame in terms of an interaction probability of each object by applying the optical flow rate of each segmented object from the filtered video frames and the depth score of each segmented object to the memory based neural network. The interaction probability is calculated using the memory based neural network. The memory based neural network takes the video frames, the optical flow and the depth score as input, and outputs the interaction probability, i.e., the probability with which the objects in the video frames are interacting. In the example, the interaction probability of the ball and human is 0.95, the interaction probability of the human and goal post is 0.05, and the interaction probability of the goal post and ball is 0.05, in the video frame. In response to detecting that the interaction probability of ball and human are 0.95 and thus is the highest interaction probability among the interaction probabilities of the ball and human, the human and goal post, and the goal post and ball, the interaction detector (114) detects that the ball and human are interacting objects in the video frame.

At 407, in response to detecting the interacting objects in the video frame, the cluster generator (115) creates the object clusters of the interacting and non-interacting objects in the video frame. In the example, the ball and human are interacting objects, and the goalpost is the non-interacting object in the video frame. Therefore, the cluster generator (115) creates a first object cluster including the ball and human and a second object cluster including the goalpost. In response to clustering the objects, the cluster generator (115) determines the cluster flow rate (α) of each object cluster. In a case in which an object cluster contains multiple objects, the cluster generator (115) determines the cluster flow rate (α) of the object cluster containing the multiple objects by calculating the average optical flow rate of each segmented object in the object cluster. In the example, the cluster flow rate (α) of the object cluster that includes the ball and human is clustered_flow1, whereas the cluster flow rate (α) of the object cluster that includes the goalpost is clustered_flow2. The clustered_flow1 is determined by calculating the average optical flow rate of the ball and human in the first object cluster. The clustered_flow2 is determined by calculating the optical flow rate of the goalpost in the second object cluster.

At 408, the temporal proximity change detector (116) generates the hash table of the proximity change coefficient (β) using a change in clustering of the segmented objects at different instants of time in the video. At 409, the significance score determiner (117) determines the significance score of each object or object cluster based on the rigidness score, and based on the cluster flow rate (α) and/or the proximity change coefficient (β). In the example, the significance score of the ball and the human are 0.6 and 0.3 respectively. Since goalpost does not move, the optical flow corresponding to the goalpost will be negligibly small. Hence, the significance score of the goalpost is zero. Further, the significance score determiner (117) determines the sectional interpolation rate of each section in the video frame containing the objects based on the significance score of the objects. At 410, the masked interpolation engine (118) generates the sectional slow motion video by interpolating the sections in the video based on the sectional interpolation rate.

Figure 5A:
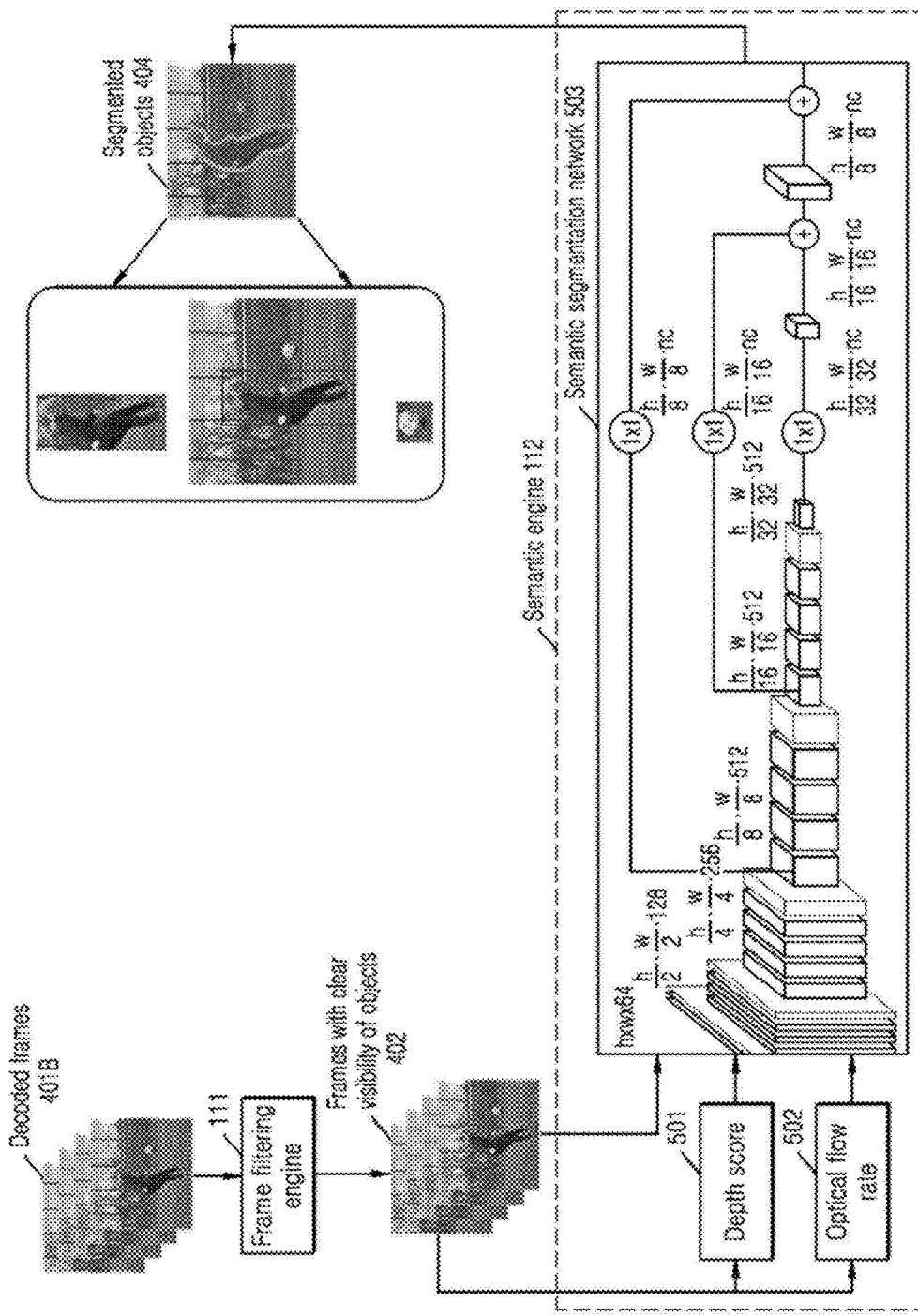
FIG. 5A is a flow diagram illustrating a method of segmenting objects in the video, according to an embodiment.

FIG. 5A is a flow diagram illustrating a method of segmenting objects in the video, according to an embodiment. In response to decoding the video frames in the video at 401B, the filter frame engine (111) filters the video frames having a class confidence score that is greater than the class confidence score threshold as the video frames with clear visibility of the objects at 402. The video frames filtered from the filter frame engine (111) are further processed by the segmentation engine (112). The segmentation engine (112) identifies the objects in the video frame. Further, the segmentation engine (112) applies the optical flow rate (502) and the depth score (501) of each object in the filtered video frames to the semantic segmentation network (503). The semantic segmentation network (503) outputs a probability of each pixel of the video frame belonging to object classes (e.g., ball, human, goalpost). Further, the segmentation engine (112) obtains the segmented objects (404) in each video as an output from the semantic segmentation network (503).

Figure 5B:
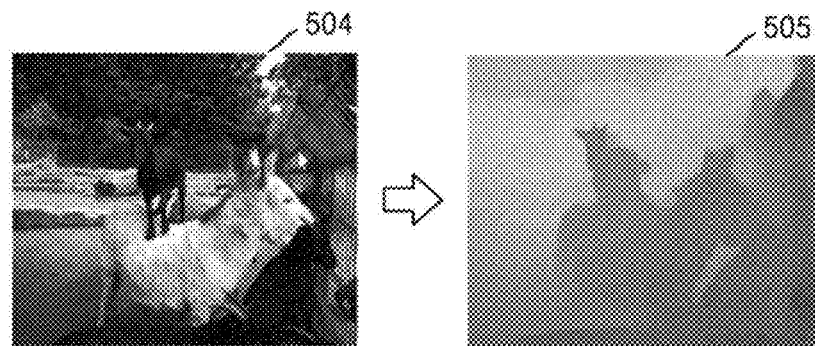
FIG. 5B illustrates an example scenario of determining a depth score of objects in a video frame, according to an embodiment.

FIG. 5B illustrates an example scenario of determining a depth score of objects in the video frame, according to an embodiment. The electronic device (100) obtains the depth score from the camera sensor by capturing depth patterns along with the image of the objects. The depth patterns may correspond to the depth information discussed above. In another embodiment, the electronic device (100) determines the depth score using classical image processing or deep learning based methods. The electronic device (100) performs the classical image processing or the deep learning on the image (504) to generate the image map (505) and clarifies the objects in the image with their depth score as shown in 506.

Figure 6:
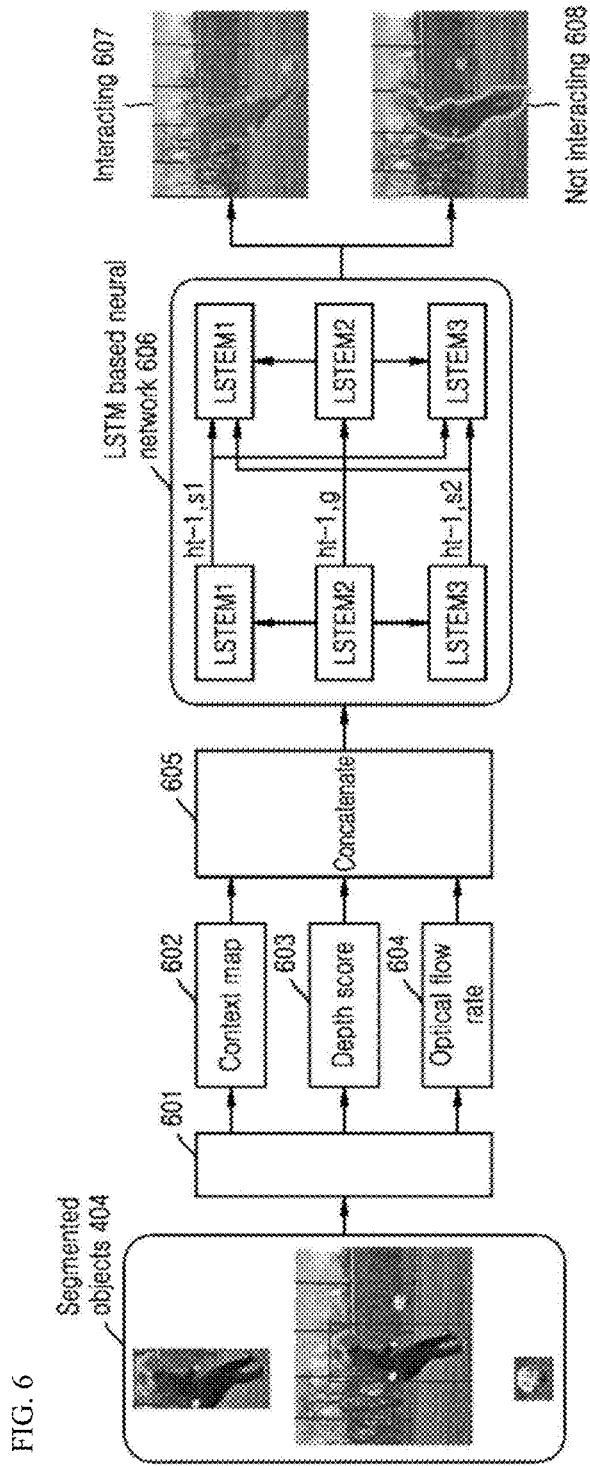
FIG. 6 is a flow diagram illustrating a method for determining an interaction between the segmented objects, according to an embodiment.

FIG. 6 is a flow diagram illustrating a method for determining the interaction between the segmented objects, according to an embodiment. In response to segmenting the objects at 404, the interaction detector (114) determines a context map (602), the depth score (603) of each segmented object, and the optical flow rate (604) of each segmented object at 601. The context map is obtained using an intermediate activation of pre-trained networks that have been pre-trained to perform an image classification task. In this case the input image is passed through the pre-trained network which has been trained to perform the image classification task and one or more intermediate layers may be taken as output which represents the context map. At 605, the interaction detector (114) provides a concatenate value of the context map (602), the depth score (603), and the optical flow rate (604) to a network built using the memory based neural cells (i.e., LSTM based neural network). At 606, the interaction detector (114) detects whether or not the segmented objects are in interaction with each other in a time span using the network built using the memory based neural cells. At 607, the interaction detector (114) categorizes the segmented objects into an interacting class in response to detecting interaction between the segmented objects. At 608, the interaction detector (114) categorizes the segmented objects into a non-interacting class in response to detecting no interaction between the segmented objects.

In an embodiment, the LSTM based neural network outputs a probability score denoting whether two objects are interacting or not. For example, if the ball and the human are interacting, the probability will be high (e.g., 0.99) and if the ball and human are not interacting, the probability will be low (e.g., 0.1).

Figure 7A:
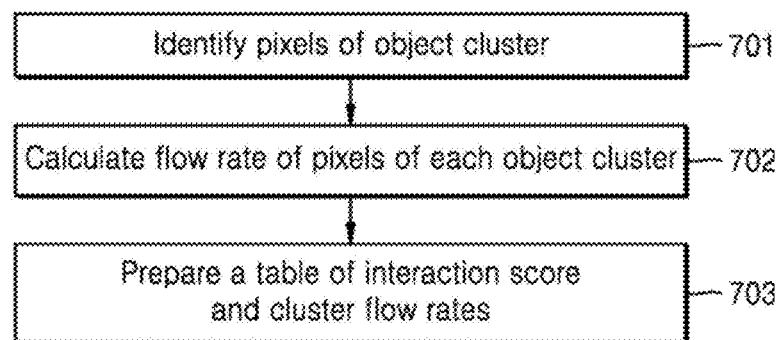
FIG. 7A is a flow diagram illustrating a method for generating a hash table of a proximity change coefficient, according to an embodiment.

FIG. 7A is a flow diagram illustrating a method for generating the hash table of the proximity change coefficient (β), according to an embodiment. In an embodiment the temporal proximity change detector (116) identifies the pixels of the object cluster at 701. Further, the temporal proximity change detector (116) calculates the flow rate of pixels of each object cluster at 702. At 703, the temporal proximity change detector (116) prepares the table of an interaction score and the cluster flow rates. The interaction score is 1 if two objects are interacting, otherwise the interaction score is 0.

Figure 7B:
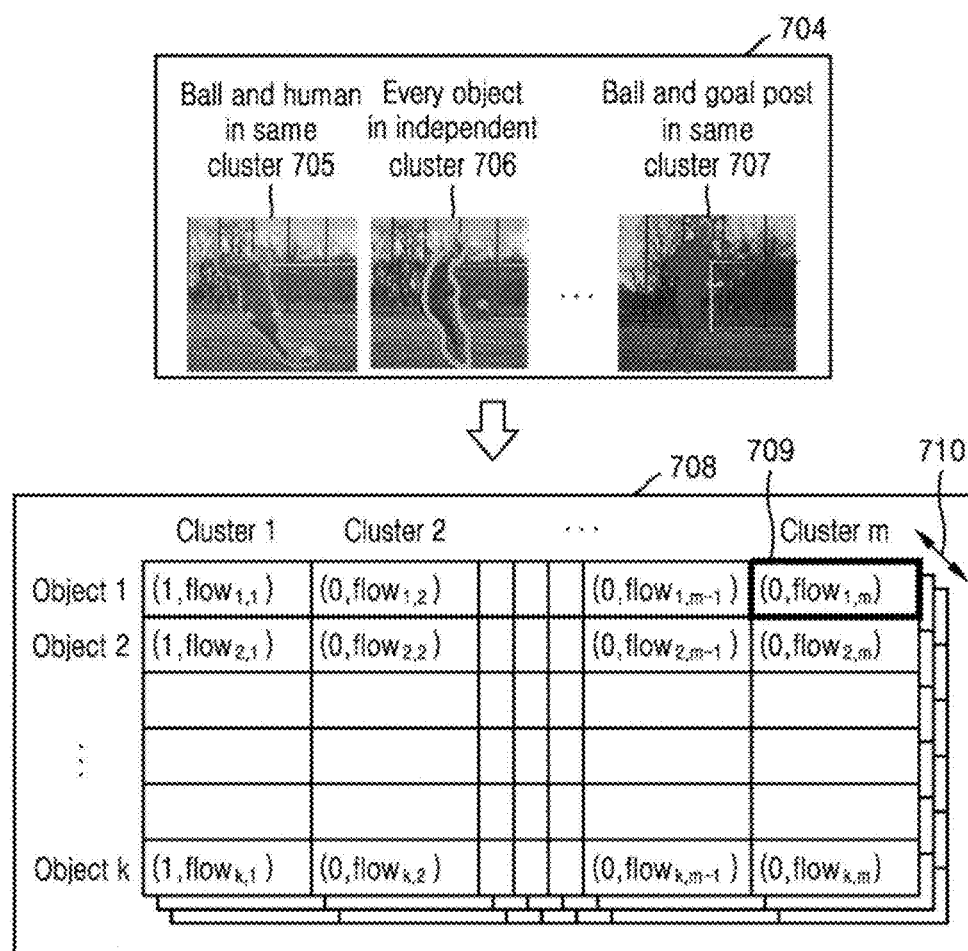
FIG. 7B illustrates an example scenario of generating the hash table of the proximity change coefficient, according to an embodiment.

FIG. 7B illustrates an example scenario of generating the hash table of the proximity change coefficient (β), according to an embodiment. Item 704 represents the object clusters in the video frames (705-707) (see discussion above). The temporal proximity change detector (116) counts the number of times a proximity of the object changes from different object clusters in a given span of time from the object clusters in the video frames (705-707). Further, the temporal proximity change detector (116) dynamically creates the hash tables (708) arranged in Three Dimensionally (3D) for storing the proximity change of the objects in different object clusters at different time stamps. Item 710 is z axis direction of the hash tables arranged in 3D and denotes a timestamp Δt at which the hash table is created. In another embodiment, the hash table may also store the cluster flow rate (α) and the object interactions among various clusters.

Item 709 denotes a first Boolean in tuple for each cell tpcd[l][m][n] is equal to:
1: if object 1belongs to cluster m
0: otherwise The second element in the tuple shows optical flow rate of object 1. Here, n corresponds to the frame dimension or time dimension.

In an example, tpcd[l][m][0] denotes a 2d table for a first video frame. Similarly, tpcd[l][m][1] denote a 2d table for second video frame etc. Also for 2d table say tpcd[m][n[0], m here denotes rows that indicate objects and n here denotes columns which denote object cluster number. So, tpcd[0][0][0] denotes a first object, a first object cluster and a first frame of the video.

Tpcd[1][2][5] represent tuple for a second object, a third object cluster and a sixth frame of the video. Each 2D table stores information about a frame. The 2D tables when stacked for all the video frames forms the 3D table.

In an example scenario, consider the tpcd[1][0][0] in the hash table 408 of FIG. 4 and the video frames (705-707). Then the cluster flow rate3 (α) of an object cluster 3=(flow of ball+flow of human)/2=(0+0.110)/2=0.055. where the object cluster 3 is the cluster of ball and human of the first video frame (705) of the video. Similarly each object cluster in each video frame has a cluster flow rate. Consider, the second frame (706) contains a cluster that contains only the ball. The cluster that contains only the ball has a cluster flow rate the same as that of the flow rate of the ball.

The proximity change coefficient (β) is equal to the number of times the object changes cluster within the time Δt. In the example, consider the ball has changed cluster four times. Initially the ball was alone prior to the human approaching the ball to kick the ball. Further, the ball was in cluster with human, as the human kicked the ball. Further, the ball was in the air and alone as a cluster. Further, the ball was in cluster with the goal post. Further, the ball is again alone after deflecting off of the goalpost, i.e., the same as cluster 1. So, the ball changes cluster 4 times—alone, with human, with goalpost, alone. Therefore, β of the ball is 4. In case of the human, initially the human was alone. Further, the human was in cluster with the ball. Further, the human was alone. So, total number of changes of human is 2 and hence β of the human is 2.

The hash table 408 in the FIG. 4 belongs to the first frame. Similarly, a z axis direction of hash table 408 includes hash tables corresponds to other video frames. A first entry of the hash table 408 denotes whether the corresponding row, i.e., object (e.g. ball), is in the corresponding column, i.e. cluster of the ball and human. Further, the method provides the sectional SloMo effect to only that portion of the video where the object cluster change does not occur to maintain a time consistency.

Figure 8A:
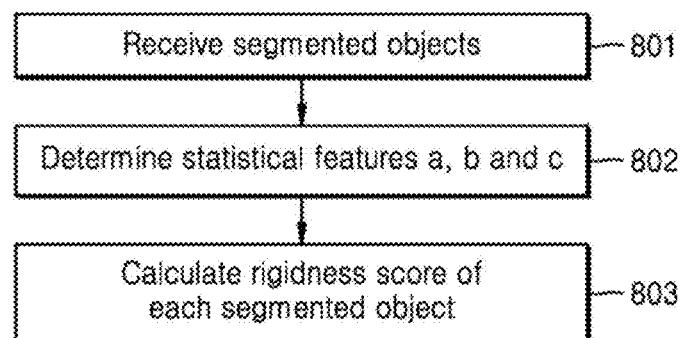
FIG. 8A is a flow diagram illustrating a method for estimating a rigidness score of an object, according to an embodiment.

FIG. 8A is a flow diagram illustrating a method for estimating the rigidness score of the object, according to an embodiment.

At 801, the rigidness score estimator (113) receives segmented objects from the segmentation engine (112).

At 802, the rigidness score estimator (113) may determine statistical features including (a) the relative frequency of the segmented objects occurring in the video, and (b) a perceptual aesthetic quality of the video frame, and (c) a degree of movement of the segmented objects based on the object classes of the segmented objects.

At 803, the rigidness score of each segmented object is calculated based on the statistical features, i.e., based on at least one of (a), (b), and (c).

Generally, humans give more importance to living things such as pets over non-living things. Hence, the humans are more pleasant for recording the slow motion video of hierarchically advanced objects. The rigidness score is determined using an ML model trained on pre-recorded slow motion videos and the statistical features including (a) the relative frequency of the segmented objects occurring in the video, (b) a relative visually pleasing appearance of the objects from perspectives of users, and (c) a degree of movement of the segmented objects based on the object classes of the segmented objects. The relative visually pleasing appearance of objects from perspectives of users is a metric measurement of an aesthetic value of the video frame using a pre trained CNN networks on Aesthetic value Analysis (AVA) dataset of images labeled with a score of aesthetic values between 0 and 1. The pre trained CNN network may be trained on other publicly available datasets or it is possible to generate a custom dataset for aesthetic values to train the CNN network. The relative frequency of the segmented objects occurring in the video (a) may be determined using equations 2:

$$a = \frac{\text{Number of times the object occurred in slow motion video}}{\text{Total number of occurences in all videos}} \quad (2)$$

The rigidness score may be calculated using the equation 3 based on the statistical features, i.e., based on at least one of (a), (b), and (c):

$$\text{Rigidness Score} = \lambda 1 a + \lambda 2 b + \lambda 3 c \quad (3)$$

where λ1, λ2, λ3 contribute a weightage to the parameters (a), (b), and (c) respectively in calculating the in the rigidness score. In an embodiment, λ1, λ2, λ3 are used as normalization factors to the parameters (a), (b) and (c) respectively. Here, (a) denotes the relative frequency of the segmented objects occurring in the video and (b) denotes the relative visually pleasing appearance of the objects. (c) denotes a degree of movement of the segmented objects based on the object classes of the segmented objects.

A statistical preference or the relative frequency of objects occurring in the video is a parameter showing the object category/class which has occurred most frequently in past recordings of slow motion videos. The object occur most number of times in slow motion videos suggests that object is more important for slow motion as compared to other objects in the video. The statistical preference (a) denotes the statistical aspects of preference towards the slow motion videos. The statistical preference (a) static properties of an object's motion affinity for movement. If the reference dataset is fixed then the value the statistical preference (a) remains as a fixed value. The slow motion factor is nonlinear directly proportional to the statistical preference (a). Consider, a dataset of 1000 normal slow motion videos recorded at uniform frame rates. The electronic device (100) checks for parts in the 1000 normal slow motion videos where the human is slow motioned occurs 420 times and total number of videos in which humans occurred is 860. Therefore, statistical preference of the human (ahuman)=420/860=0.488. Similarly each object class has a set of values for a video dataset. Generally, a user tends to convert to slow motion an image of jumping, running etc. containing the human. So the preferences are given for objects such as human.

The perceptual aesthetic or visible quality (b) of the video frame denotes how good the video frame looks to human eyes. The slow motion factor is nonlinear directly proportional to the perceptual aesthetic or visible quality (b). The perceptual aesthetic quality (b) is calculated in terms of a probability of how good the video frame looks to the eye, using a neural network which is trained on a dataset of images labeled with score of aesthetic values between 0 and 1. Neat and clear videos with good aesthetic values are preferred for recording the slow motion videos. For example, a child playing on snow with mountains in the background will have more affinity for slow motion as compared to a child playing inside the building with a non-clear image or surroundings.

Consider the first frame in the decoded frames (401B) (see FIG. 5A), doing a higher slow motion rate of the ball as compared to the human means the ball will be visible for relatively longer duration in the output sectional SloMo video. In this example a background, a lighting condition, a tone, and a contrast does not change very much so for this particular example the perceptual aesthetic quality (b) does not have a significant role. For this example the aesthetic value of the human or the ball remains almost constant throughout the video.

Consider a scenario where a color of the ball is similar to the background, or the ball looks blurred and not very clear, or there is very little contrast to notice sharp textures of a section of the ball. Now the importance to the ball is low and, hence the value of b will be low which will contribute towards a lower significance score of the ball, making the ball appear for a relatively smaller time in the output sectional SloMo video.

Figure 8B:
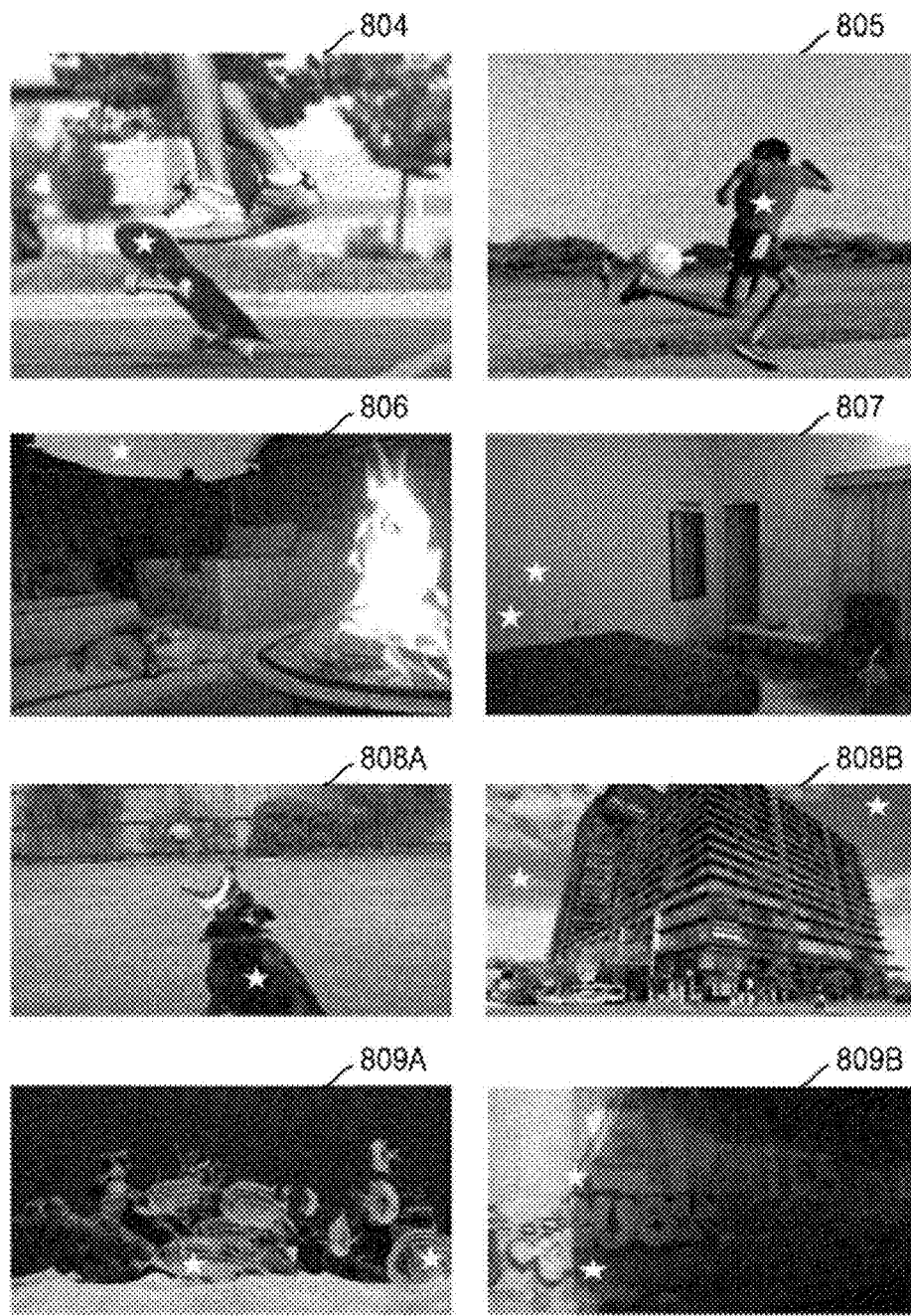
FIG. 8B illustrates an example scenario of different type of objects in different video frames, according to an embodiment.

FIG. 8B illustrates an example scenario of different type of objects in different video frames, according to an embodiment. The electronic device (100) classifies the different type of objects in FIG. 8B to different object classes and determines the rigidness scores based on the parameters (a) and (b). As shown in 804 and 805, an object class such as sports equipment is often presented along with the human in the video frame to be slow motion relevant. Aesthetic value of the scenes like fire (shown in 806), waves, flora have higher aesthetic value than others. The video frame shown in 807 has lower aesthetic value for slow motion content.

In an example, consider a dataset of 1000 normal slow motion videos, where a dog has been in large number in the videos with slow motion effect in the reference dataset and the dog belonging to an animal category. Therefore the electronic device (100) calculates the statistical preference (a) of the dog in the video frame 808A as 0.422.

In another example, consider a dataset of 1000 normal slow motion videos, where a building has been in less number in the videos with slow motion effect in reference dataset. Therefore, the electronic device (100) calculates the statistical preference (a) of the building in the video frame 808B as 0.002.

In an embodiment, an additional parameter (c) with a constant value may also be used for determining the rigidness score, if the reference dataset that are used to calculate the parameter (a) is inaccurate or biased. The parameter (c) is a manually annotated value using a degree of movement of some object classes. For example, object classes like, animals, birds, humans may have a greater degree of movement than other object classes such as buildings, trees etc. The parameter (c) is manually annotated for various fixed objects categories (e.g. 1000 majorly occurring objects in a video and used to reduce bias).

In an example, the electronic device (100) calculates the perceptual aesthetic quality (b) of the video frame 809A as 0.86, where the probability is higher because the video frame 809A is more aesthetically pleasing to the human eyes.

In another example, the electronic device (100) calculates the perceptual aesthetic quality (b) of the video frame 809B as 0.14, where the probability is less because the video frame 809A is not aesthetically pleasing to the human eyes.

Figure 8C:
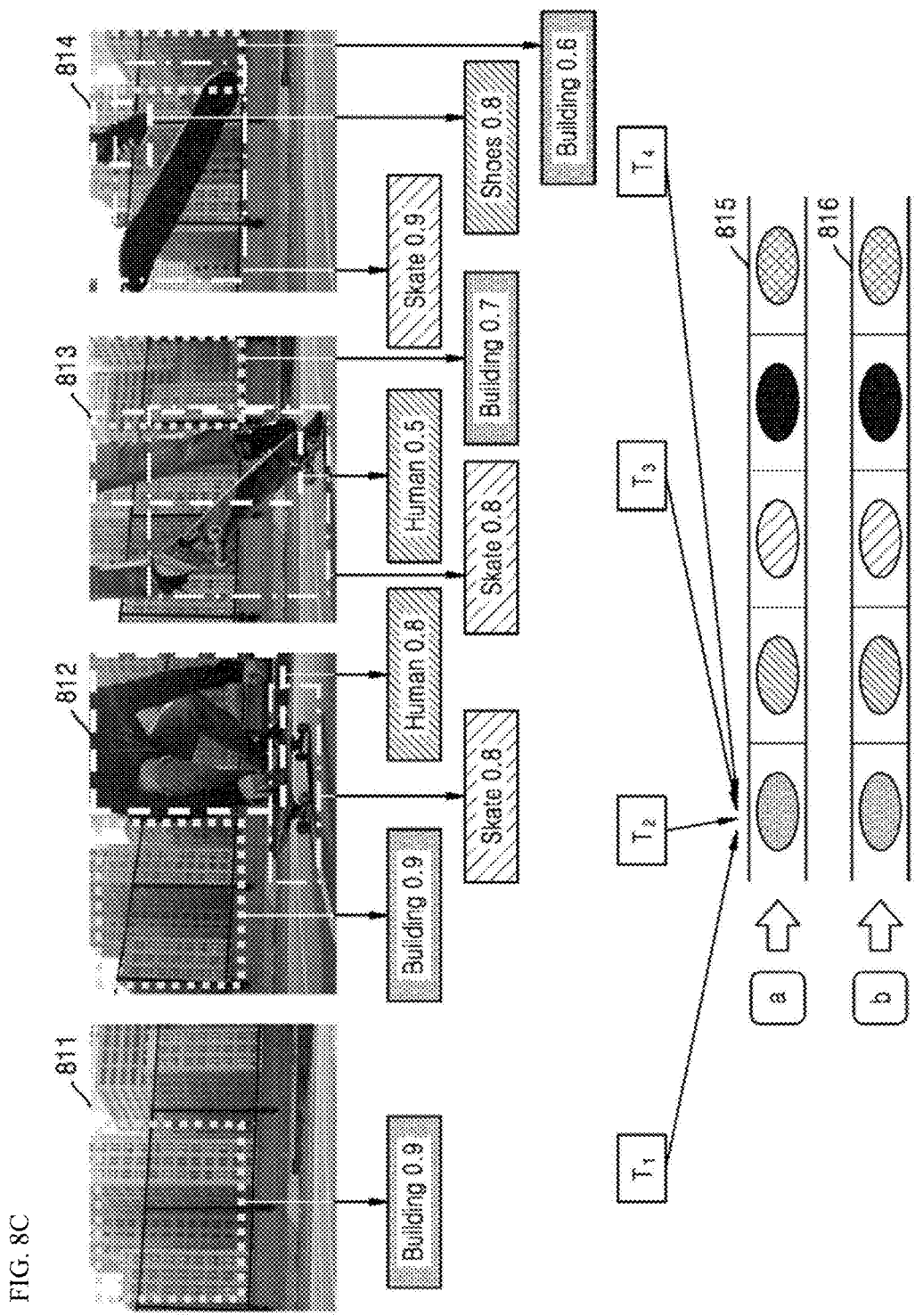
FIG. 8C illustrates an example scenario of determining linear coefficients $\lambda 1$, $\lambda 2$ according to an embodiment.

FIG. 8C illustrates an example scenario of determining linear coefficients $\lambda 1$, $\lambda 2$, according to an embodiment. The dataset used for training the ML model contains normal (i.e., non-slow motion) videos and slow motion videos captured or converted by users. A first step for modelling includes extracting the object classes from each video frame. Using a Linear Regression taking RS as input and 0/1 as output (SloMo or normal video), the weights ($\lambda$) to be assigned for each parameter may be obtained. Various (a) and (b) values for the objects are stored in the reference dataset (i.e., generated from 1000 videos). These values are stores as features in a file in the memory (120). A ground truth corresponding to this modelling is whether the video has been preferred for slow motion (or by how much affinity). Linear regression modelling is applied to predict the ground truth and coefficients of linear regression are stored as $\lambda 1$, $\lambda 2$, values.

Figure 9:
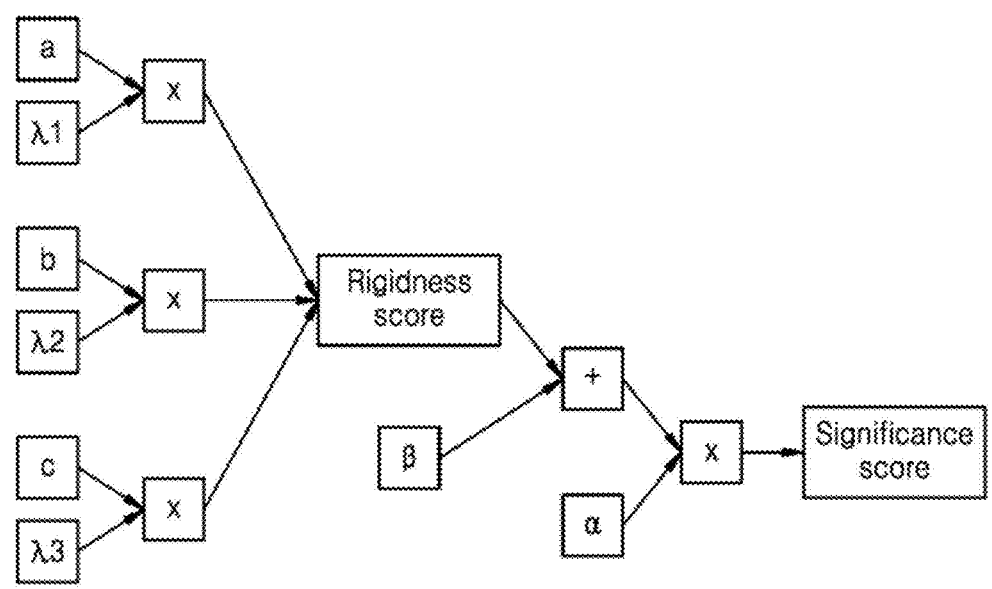
FIG. 9 is a flow diagram illustrating a method for determining a significance score of an object cluster, according to an embodiment.

FIG. 9 is a flow diagram illustrating a method for determining the Significance Score (SS) of the object cluster, according to an embodiment. In an embodiment, the significance score may be determined using the equation 4a or 4b:

$$SS = \frac{(a \times (\beta + \text{Rigidness score}))}{\sqrt{SS_i^2}} \quad (4a)$$

$$SS = \frac{(a \times \beta + \text{Rigidness score})}{\sqrt{SS_i^2}} \quad (4b)$$

where, the rigidness score=$\lambda 1a+\lambda 2b+\lambda 3c$, $\sqrt{ss_1^2}$ is a normalization coefficient which is a square root of sum of squares of different object clusters for that timestamp i for a different object cluster. where, $$\alpha = \frac{\text{Cluster flow rate}i}{\sum_{i=1}^{T} \text{Cluster flow rate}i/T}$$

where, cluster flow rate i is the flow rate of given object at a particular time instant i, where T is the total time of the slow motion video.

In another embodiment, the significance score may be determined using the equation 5:

$$SS \propto \frac{(\alpha \times (\beta + \text{Rigidness score}))}{\sqrt{SS_i^2}} \quad (5)$$

where, the rigidness score=$\lambda 1a+\lambda 2b+\lambda 3c$.

In another embodiment, the significance score may be determined using the equation 6:

$$SS \propto \frac{(\beta + \text{Rigidness score})}{\sqrt{SS_i^2}} \quad (6)$$

where, the rigidness score=$\lambda 1a+\lambda 2b$.

In another embodiment, the significance score may be determined using the equation 7:

$$SS = \frac{(\alpha \times \text{Rigidness score})}{\sqrt{SS_i^2}} \quad (7)$$

where, the rigidness score=$\lambda 1a+\lambda 2b$

In another embodiment, the significance score may be determined using the equation 8:

$$SS = \frac{(\alpha \times (\beta + \text{Rigidness score}))}{\sqrt{SS_i^2}} \quad (8)$$

where, the rigidness score=$\lambda 1a$.

In an example scenario, consider the segmented objects in the video frames (705-707) in FIG. 7B, the rigidness score of ball is 0.8 and the rigidness score of the human is 0.9. Initially, the electronic device (100) calculates the significance scores of each video frame (705-707) as follows. The significance score of the video frame (707)=(0.11/1.276)×(2+0.9)=0.25, in which the flow rate for human is 0.11 and a summation of flow rates of the human for all the frames is 1.276, the proximity change coefficient for the human is 2 and the rigidness score for human is 0.9. Similarly, the significance score of the human in first 5 video frames in the video frames (705-707) are 0.28, 0.25, 0.24, 0.26, and 0.09. Similarly, the significance score of the ball in first 5 video frames in the video frames (705-707) are 0.52, 0.48, 0.44, 0.48, and 0.45.

Further, the electronic device (100) calculates normalized significance scores. Consider, SS1h=(0.28+0.25+0.24+0.26+0.09)=1.12, and SS1b=(0.52+0.48+0.44+0.48+0.45)=2.37.

The significance score for the human $$\text{in the timestamp} = \frac{SS1h}{\sqrt{SS1b^2 + SS1h^2}} = 0.43$$

The significance score for the ball $$\text{in the timestamp} = \frac{SS1b}{\sqrt{SS1b^2 + SS1h^2}} = 0.90$$

Since, a ratio of significance scores, i.e., the significance score for the human to the significance score for the ball, is approximately 1:2, the electronic device (100) interpolates the ball at 2× slower as compared to the human based on the ratio for generating the sectional slow motion video.

Figure 10A:
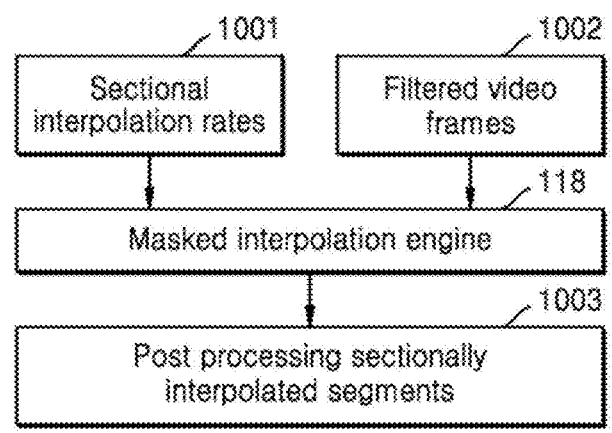
FIG. 10A is a flow diagram illustrating a method for generating the multi sectional slow motion video, according to an embodiment.

FIG. 10A is a flow diagram illustrating a method for generating the multi sectional slow motion video, according to an embodiment. The masked interpolation engine (118) receives the sectional interpolation rates (1001) from the significance score determiner (117) and the filtered video frames (1002) from the frame filtering engine (111). Further, the masked interpolation engine (118) interpolates each section in the filtered video frames based on the interpolation rate and post processes (1003) the sectionally interpolated segments in the filtered video frames.

Figure 10B:
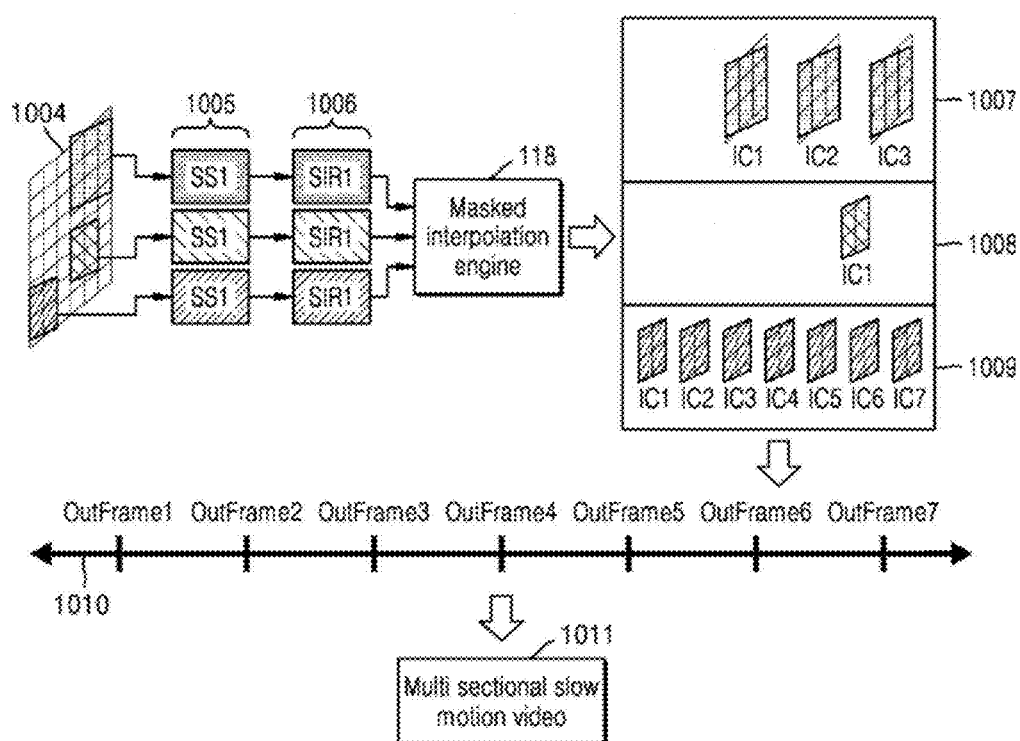
FIG. 10B illustrates an example scenario of generating the multi sectional slow motion video, according to an embodiment.
Figure 11A:
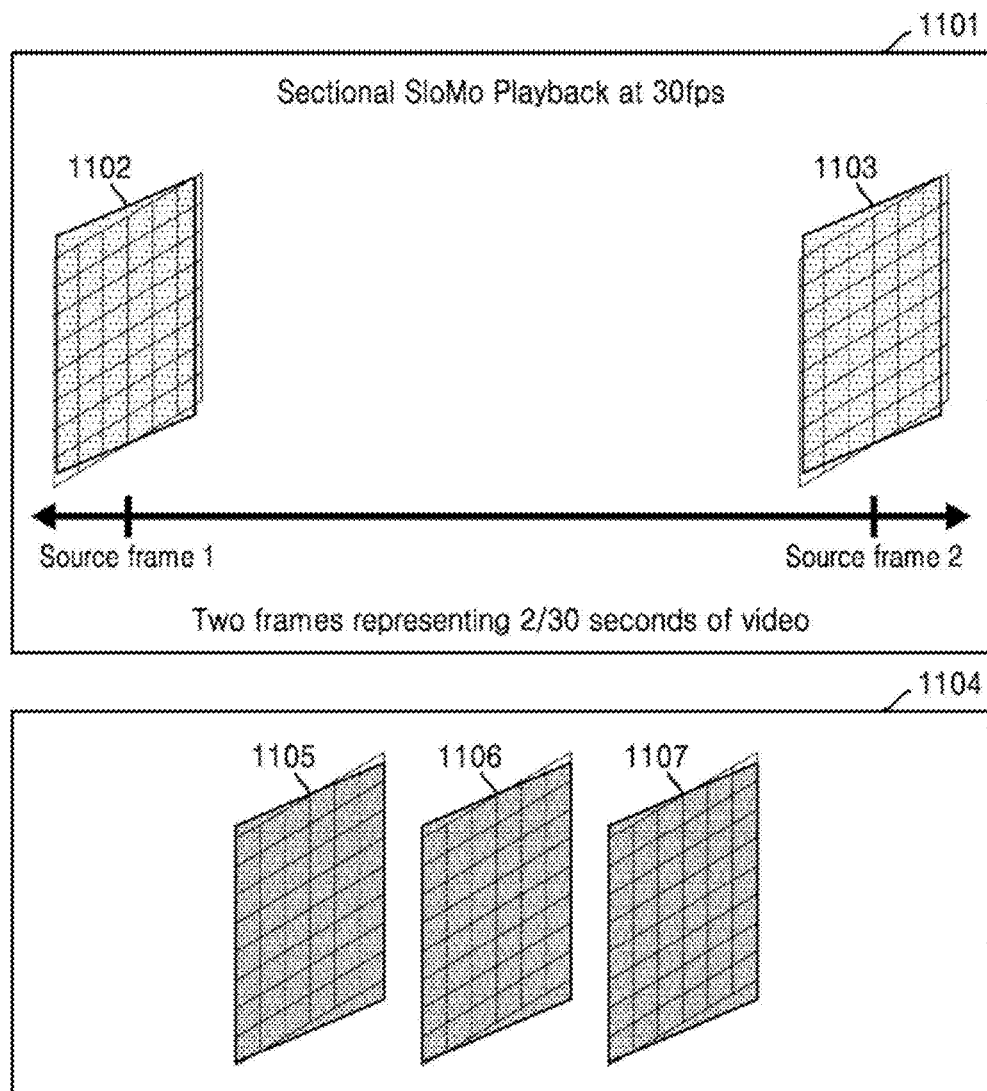
FIGS. 11A-12D illustrate a comparison of a related art method of interpolation and a masked interpolation in the method according to an embodiment.
Figure 11B:
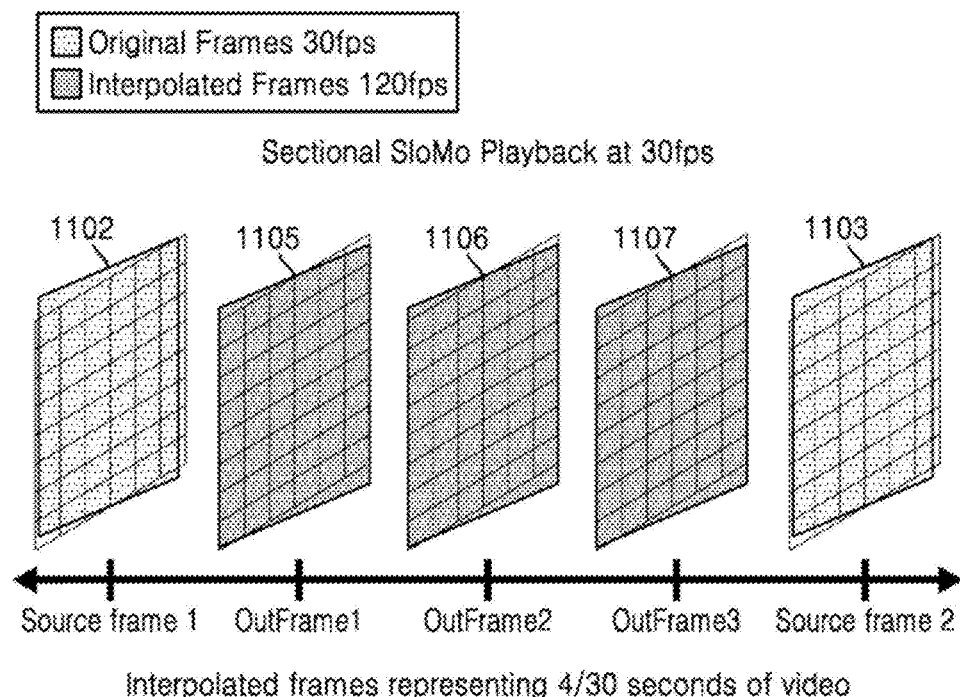

FIG. 10B illustrates an example scenario of generating the multi sectional slow motion video, according to an embodiment. In response to determining the significance score (1005) (i.e. SS1-SS3) of the sections in the video frame (1004), the significance score determiner (117) determines the sectional interpolation rate (1006) (SIR1-SIR3) of each section based on the significance score (1005) of the sections, where the sectional interpolation rate is directly proportional to the significance score. Absolute value of the sectional interpolation rate is assigned to each section based on a difference of the optical flow rate of the section in between two successive video frames.

Further, the significance score determiner (117) sends the sectional interpolation rates to the masked interpolation engine (118). The masked interpolation engine (118) is a neural network based model that takes the sectional interpolation rates and the filtered video frame as input and outputs the sectionally interpolated frames (1007-1009), where different object clusters of the video frame are interpolated at different sectional frame rates. The masked interpolation engine (118) creates a grid in which the masked interpolation engine (118) sequentially places the outputs of sectionally interpolated segments on the grid. First a segment corresponding to a first source frame is placed, then sectionally interpolated frames are placed subsequently, and after all sectionally interpolated clips are placed, a segment corresponding to a second source frame is placed on the grid. This is the process corresponding to sectional interpolation for a single object using two frames. Same process is repeated for multiple objects separately using multiple source frame pairs. Further, the masked interpolation engine (118) uses placeholders for placing the sectionally interpolated frames in between source frames for generating the multi sectional slow motion video (1011).

FIGS. 11A-12D illustrate a comparison of a related art method of interpolation and a masked interpolation in the method according to an embodiment. As shown in the FIG. 11A, item 1101 represents two original video frames (i.e. source frame 1 (1102) and source frame 2 (1103)) recorded at 30 fps. The two original video frames representing 2/30 seconds of the video. Item 1104 represents three video frames (1105-1107) to be interpolated with the two original video frames at uniform frame interpolation of 4× using the related art method of interpolation. The three video frames (1105-1107) represent 1/30 seconds of the video. As shown in the FIG. 11B, in related art methods all the frames are interpolated at the uniform rate. In this example, a 30 fps video is being converted into 120 fps video. Interpolated frame sequence corresponds to 4/30s.

Figure 12A:
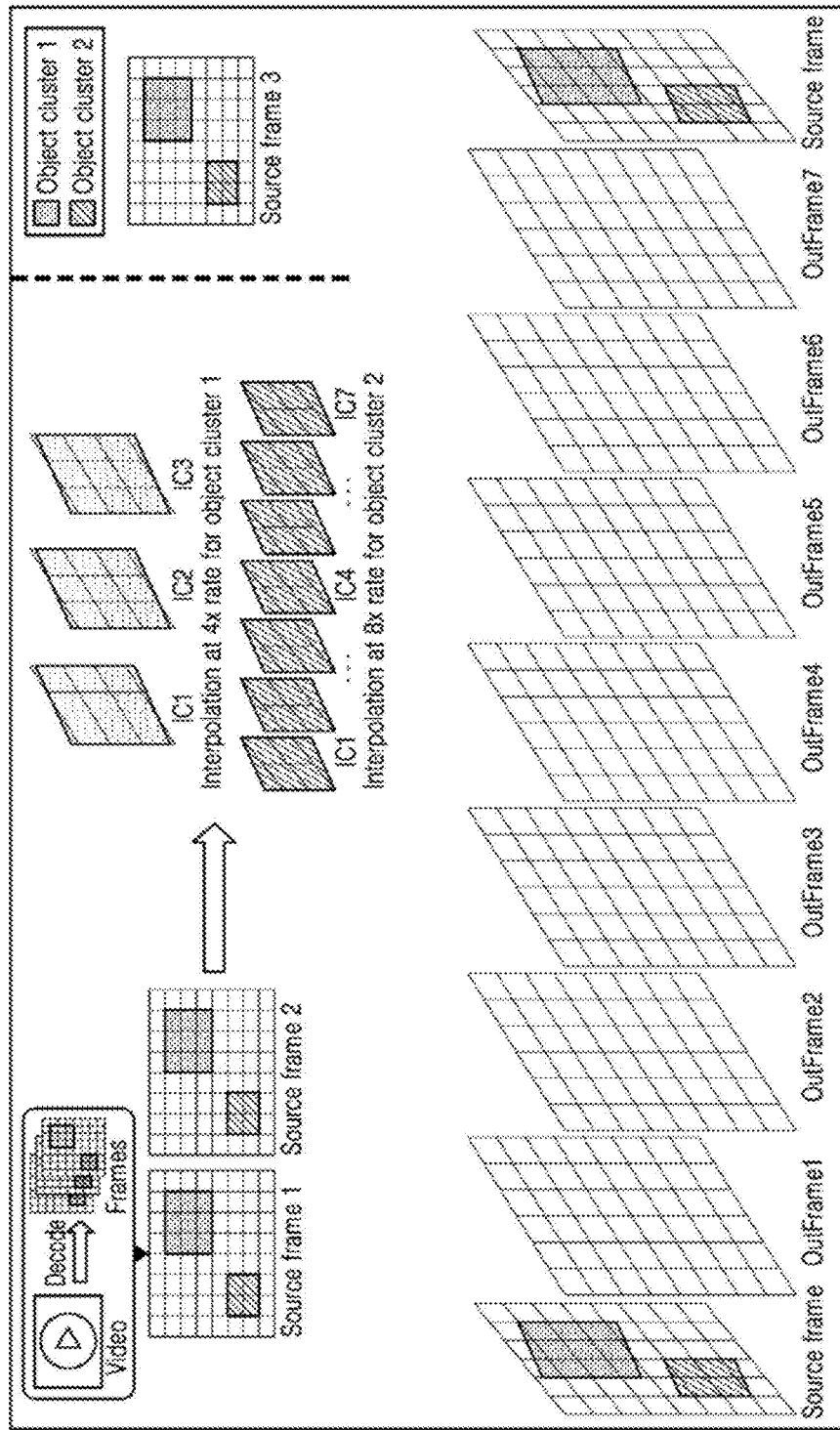
Figure 12B:
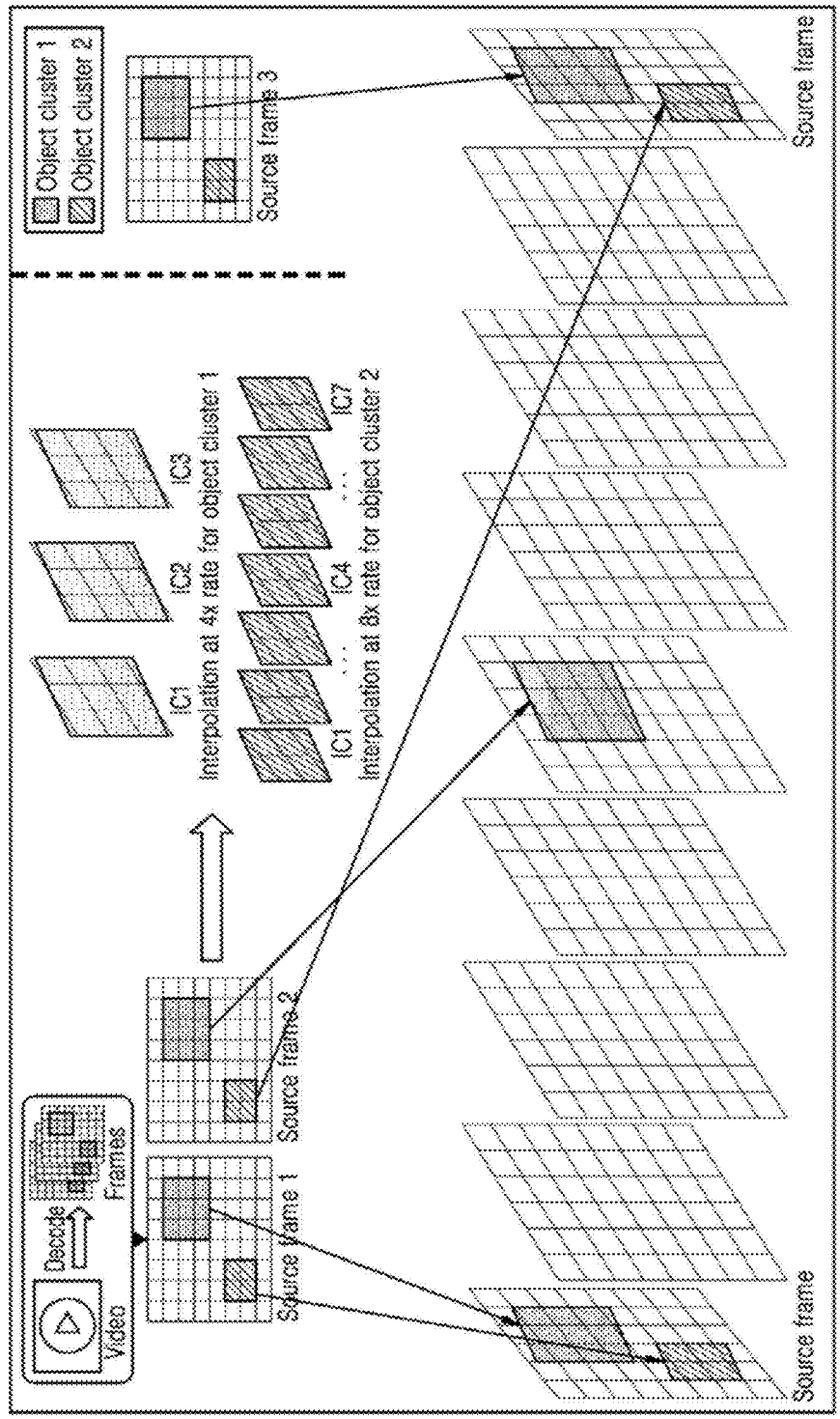
Figure 12C:
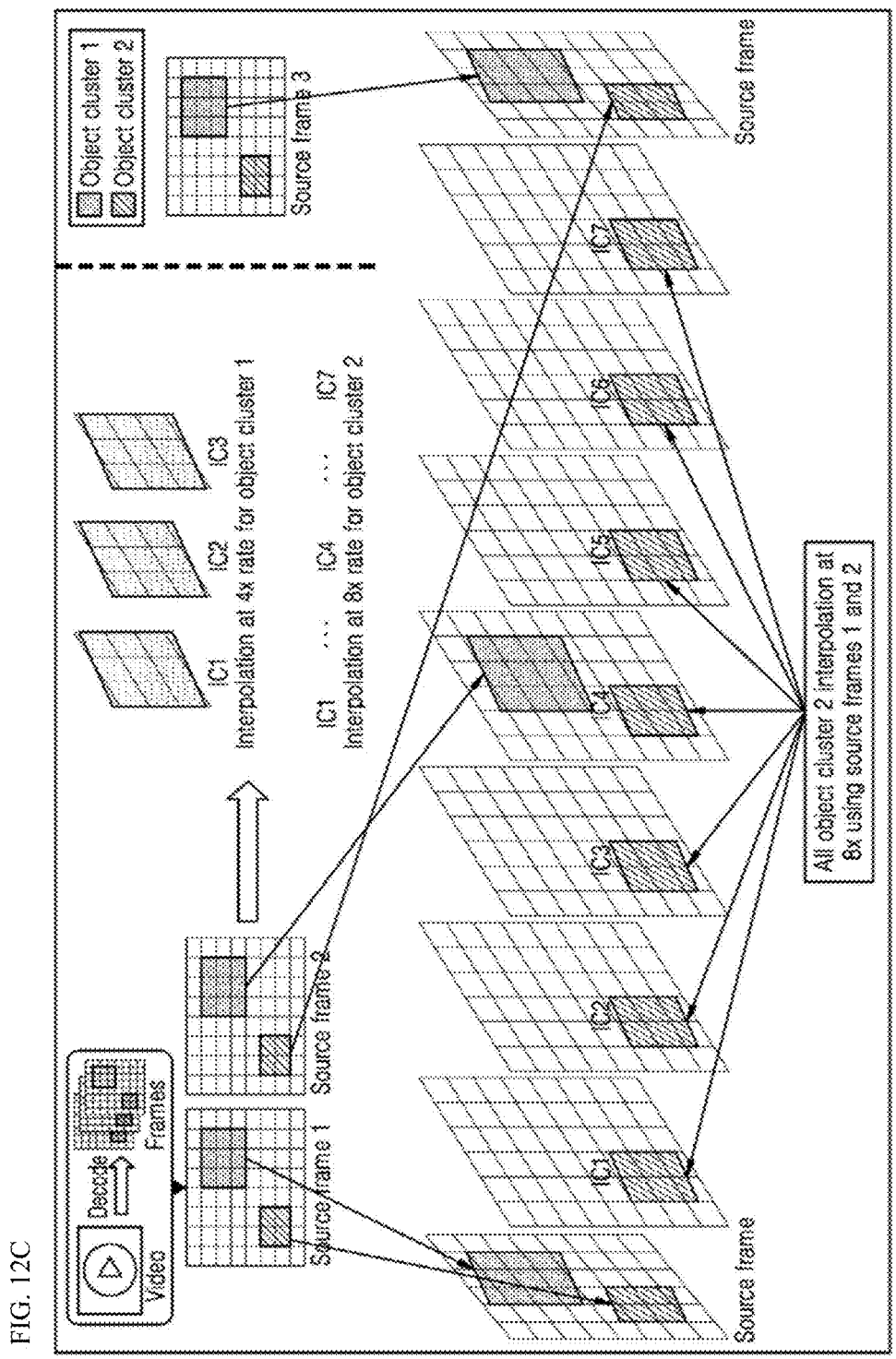
Figure 12D:
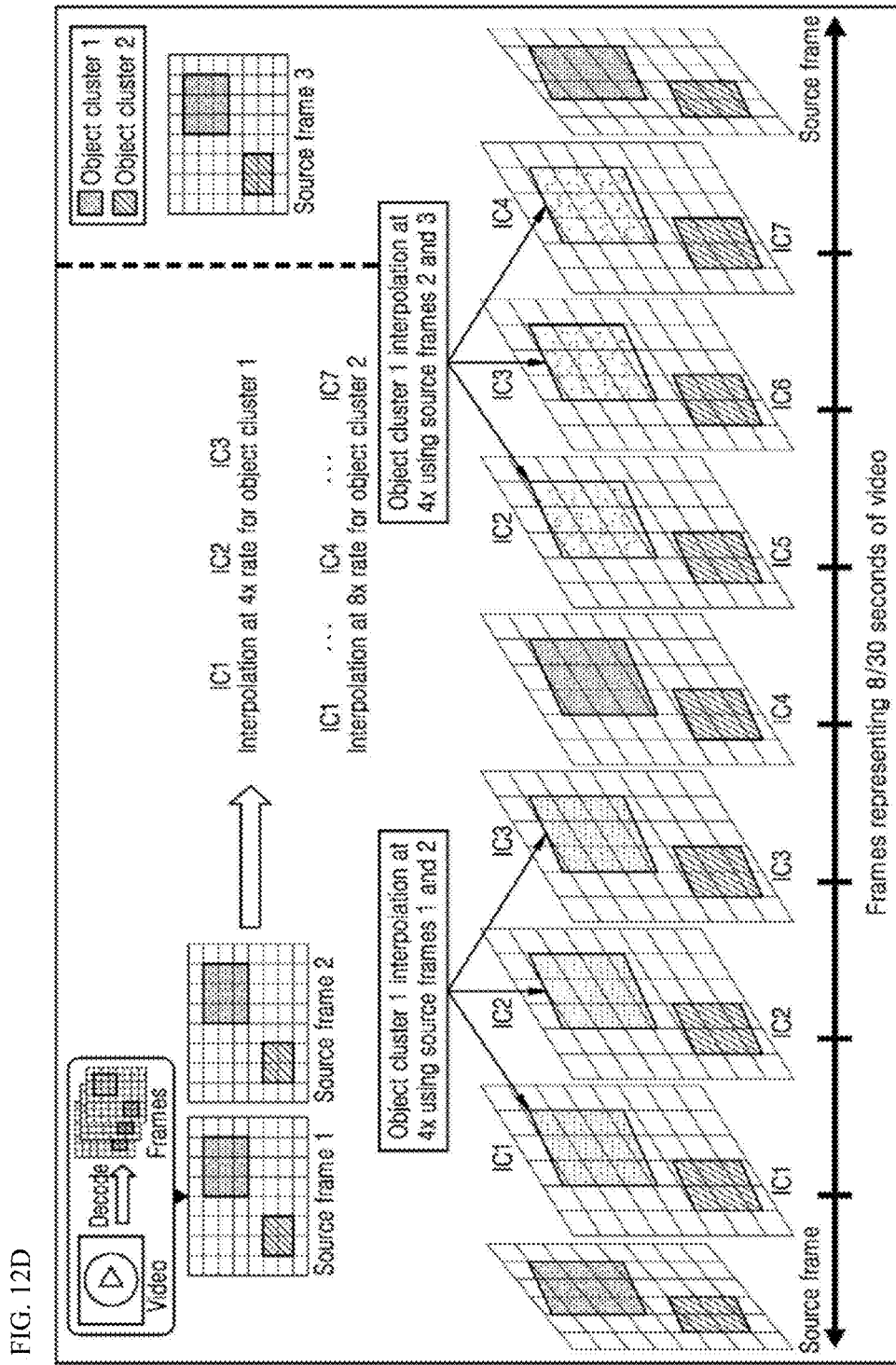

By contrast, the sectionally interpolated segments are obtained from the masked interpolation engine (118) as shown in the FIG. 12A. A different number of sectionally interpolated sectional frames are created for different objects or object clusters. After that, segments of sectional source frames are placed on the grid separated by a distance of sectional interpolation rate as shown in the FIG. 12B. After this, sectionally interpolated frames are placed on the grids as shown in FIGS. 12C-12D. Various smoothening techniques such as Gaussian smoothening or ML model based smoothening may also be applied after sectional components are arranged on the grid to reduce the boundary artifacts. After completion of grids, the frames are then combined and compressed to form the sectional slow motion video.

13A illustrates an example scenario of generating interpolation segments corresponding to the object, according to an embodiment. Consider an example of a car and a human moving together shown in 1301. Assume a slow motion at a rate of 4× for car and 2× for the human. Consider, a length of an initial video clip in which the car and the human coexist is of duration 2s at 32 fps. The electronic device (100) creates a video clip of duration of 4s with a cutoff corresponding to man because man is slow motioned at lower rate. The electronic device (100) generates the section slow motion effect for components where two object clusters not interacting with each other within that time duration. So there is no chance of inconsistency. Consider, the 4 source frames shown in 1302. The green color segments in each source frame represent the portion of human in the video frame. The red color segments in each source frame represent the portion of car in the video frame. In this example, these 4 source frames are used to interpolate the output shown in 1303 and 1304. In 1303, the electronic device (100) generates 8 interpolated segments corresponding to the portion of the human in the video frame. In 1304, the electronic device (100) generates 16 interpolated segments corresponding to the portion of the car in the video frame.

Figure 13A:
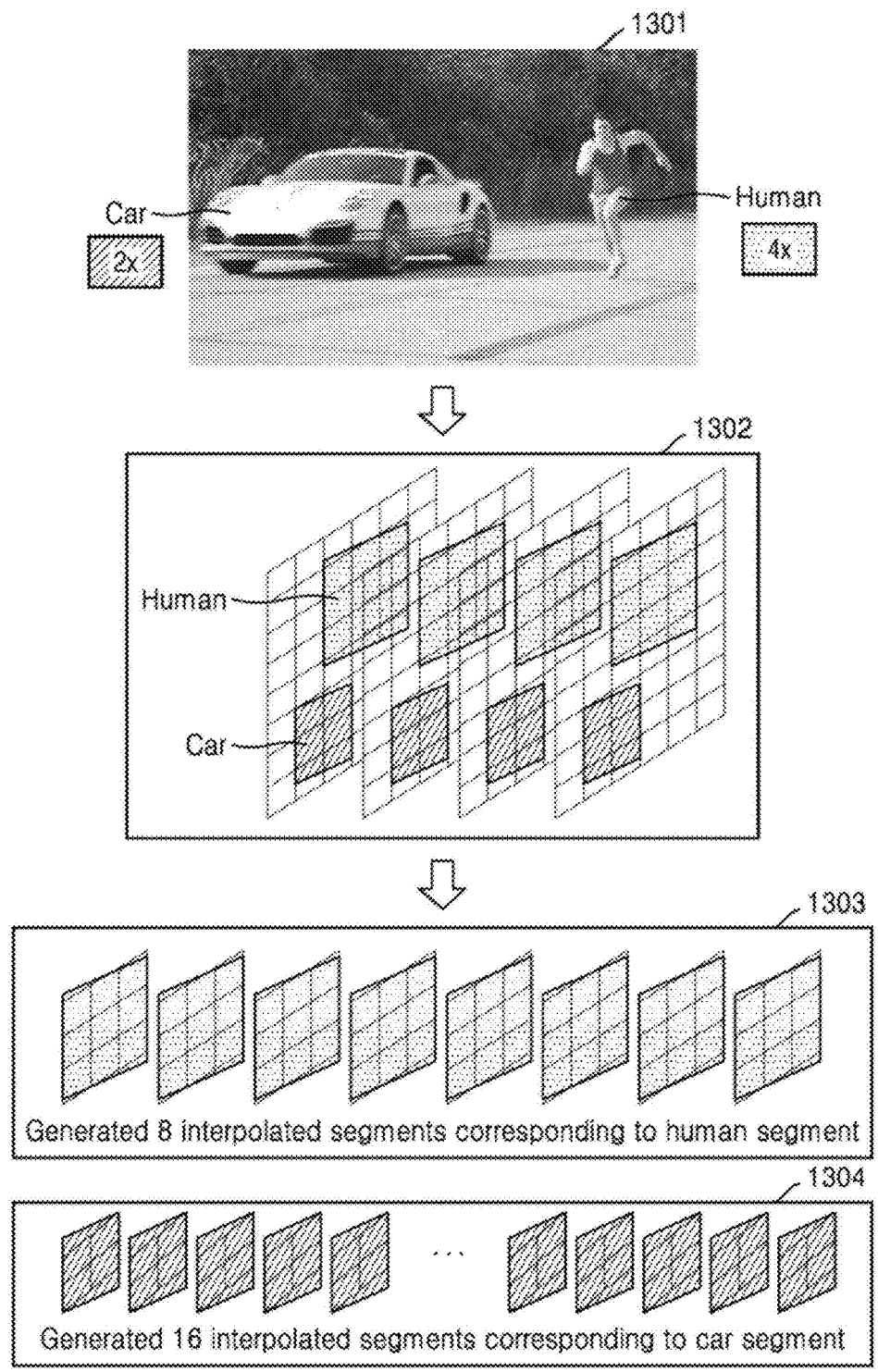
FIG. 13A illustrates an example scenario of generating interpolation segments corresponding to an object, according to an embodiment.
Figure 13B:
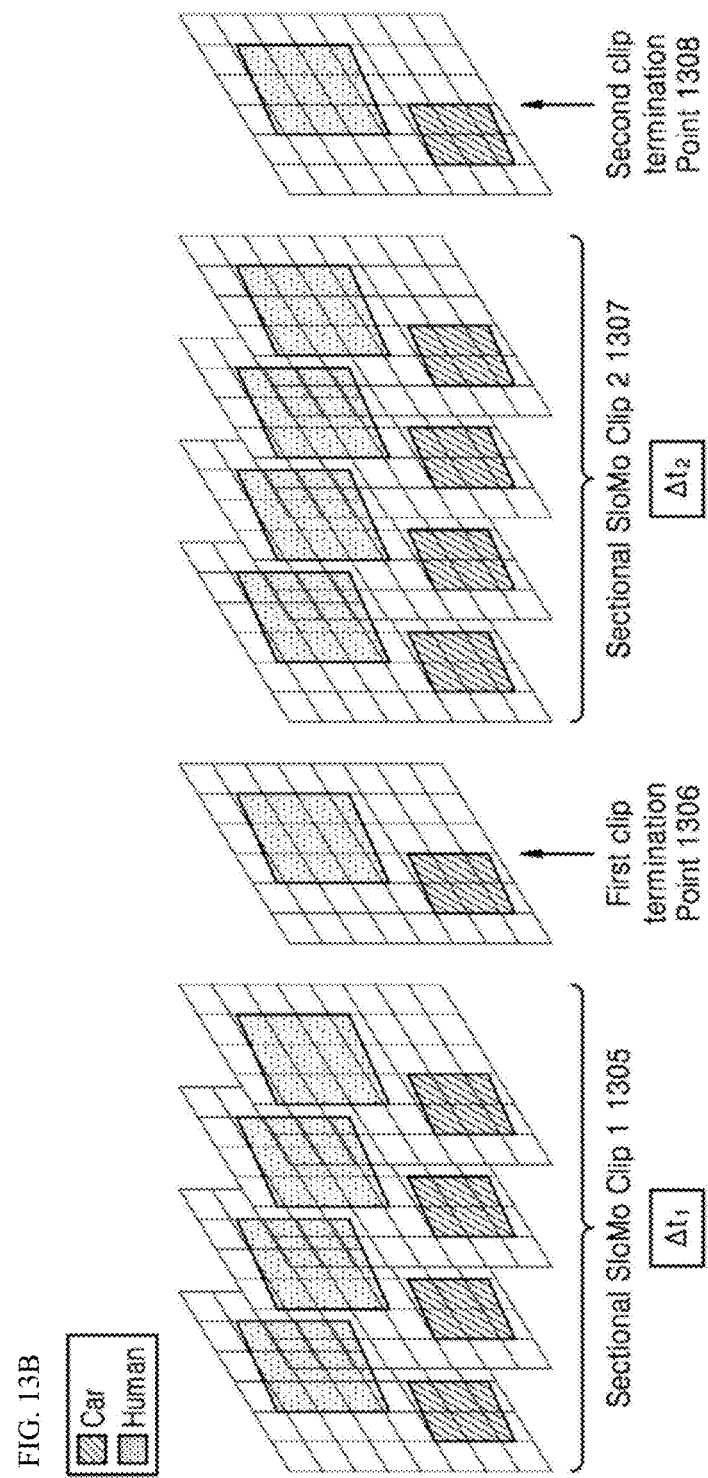
FIG. 13B illustrates an example scenario of generating sectional slow motion clips, according to an embodiment.

FIG. 13B illustrates an example scenario of generating sectional slow motion clips, according to an embodiment. The red color and green color blocks in FIG. 13B represent the section of the car and the human in the video frames respectively in 1301 of FIG. 13A. Consider, two object clusters (i.e., cluster 1 is human and cluster 2 is car) were interacting at a point. Then for a time $\Delta t1$, the two object clusters are not interacting. Further, the two object clusters came together again to interact after the time $\Delta t1$ as shown in 1306. Consider, these two object clusters are again separated for a time $\Delta t2$ and interact again after the time $\Delta t2$ as shown in 1308.

Initially, the electronic device (100) detects the interaction points of different object clusters in the video frame. Further, the electronic device (100) produces the sectional SloMo video clips corresponding to the time interval for which these object clusters are not interacting as shown in 1305 and 1307. The electronic device (100) generates different sectional SloMo clips for different time clusters for which these two object clusters are not interacting, i.e., for Δt1 and Δt2.

Figure 14:
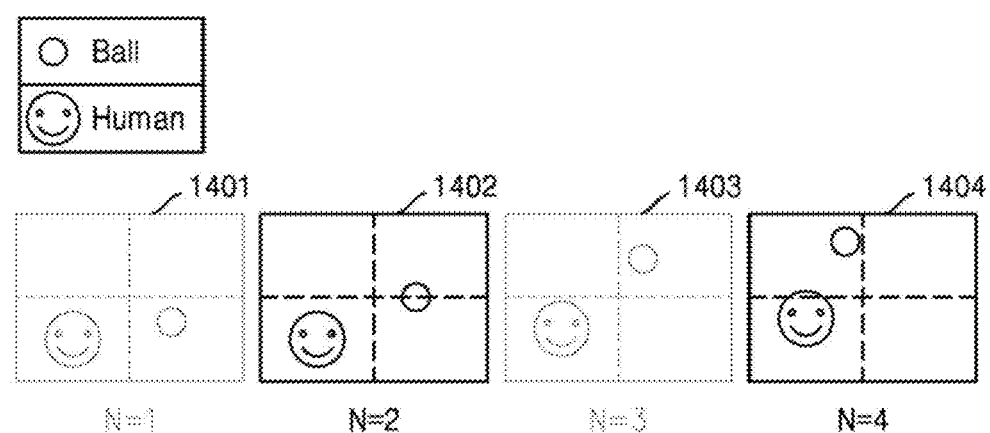
FIGS. 14-15B illustrate example scenarios for explaining inconsistency in interpolation, according to an embodiment.
Figure 15A:
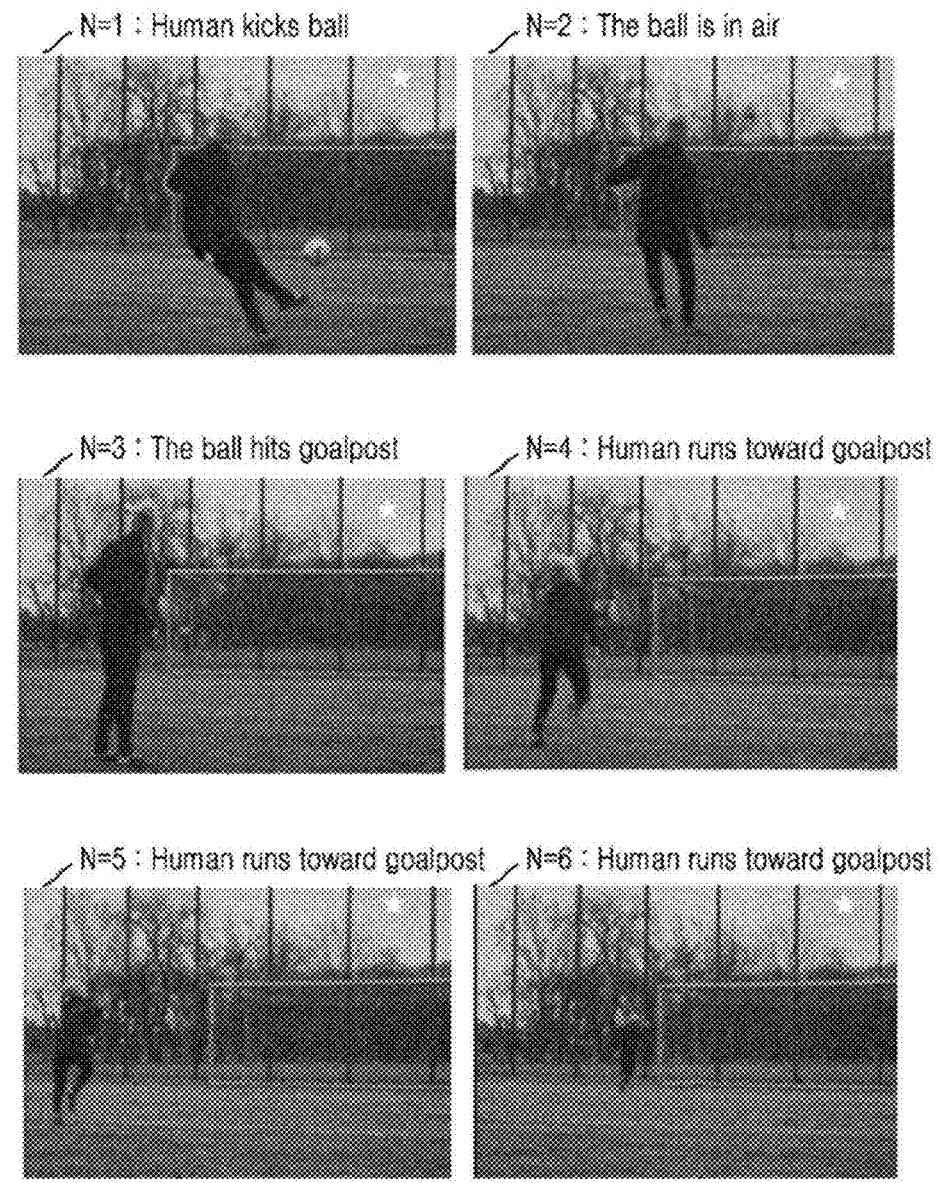
Figure 15B:
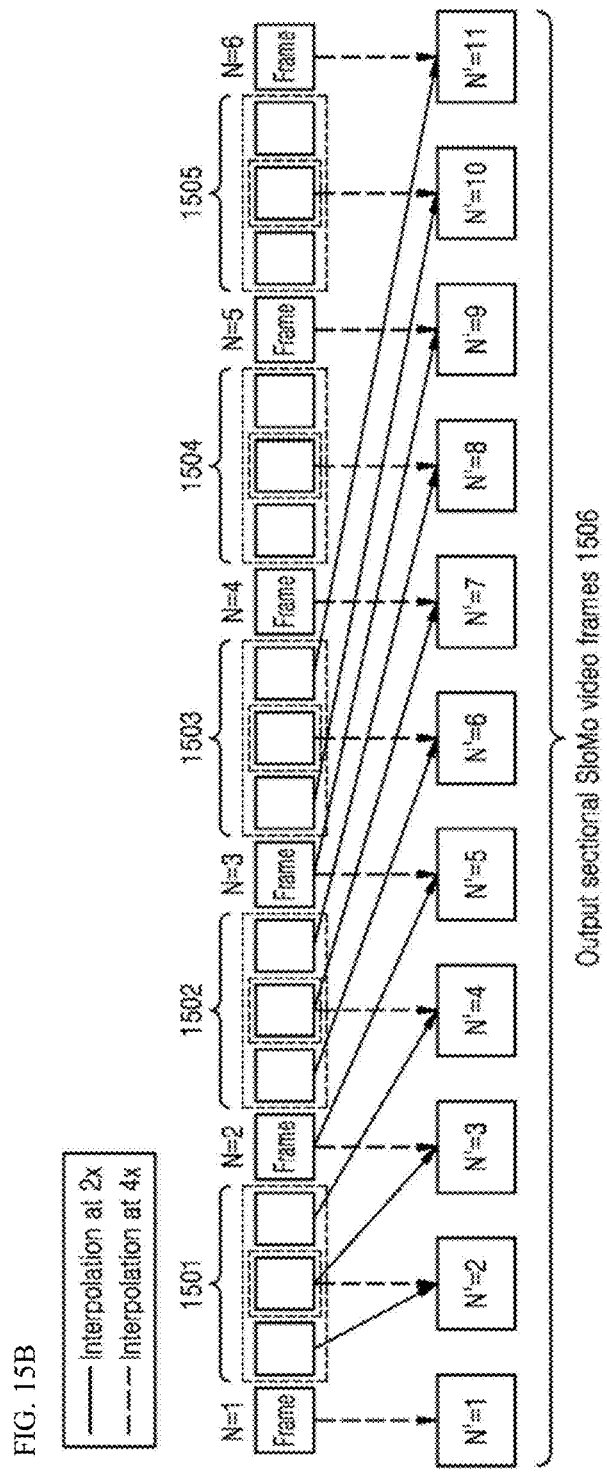

FIGS. 14-15B illustrate example scenarios for explaining inconsistency in interpolation, according to an embodiment. Consider, a person is moving slower than a ball in the video frame as shown in 1401-1404 of FIG. 14. Only one frame is displayed at time t=26 ms. That frame is neither N=2 related frame, nor is N=4 related frame. It is a hybrid of both the frames. So, for this new generated hybrid frame, the fast moving object which is slow motioned at a higher rate is taken from N=2. The slow moving object (i.e., object slow motioned at slower rate) uses the section from N=4.

Six video frames of a video of the human kicking the ball to a goalpost are shown in the FIG. 15A. At frame N=1, the human kicks the ball. At frame N=2, the ball is in air. At frame N=3, the ball hits goalpost. At frame N=4, the human runs toward the goalpost. At frame N=5, the human runs toward the goalpost which is far away from the human. At frame N=6, the human runs toward the goalpost which is near to the human.

The interpolation of the six video frames in the FIG. 15A are shown in the FIG. 15B. Item 1501 represents the interpolated frames after the frame N=1. Item 1502 represents the interpolated frames after the frame N=2. Item 1503 represents the interpolated frames after the frame N=3. Item 1504 represents the interpolated frames after the frame N=4. Item 1505 represents the interpolated frames after the frame N=5. The electronic device (100) creates a sectional slomo video with the ball at 4× and the human at 2×. At the interpolation stage, the output from the masked interpolation engine (118) consist of 11 output frames (N'=1 to N'=11). The two type of arrows in FIG. 15B indicate that information for any output frame (e.g., N'=8) is taken from two frames. In an example, for creating the frame N=8, the electronic device (100) takes information from frames (2,3) and (4,2), where frame (2,3) contributes for the motion of ball and frame (4,2) contributes for motion of the human.

For creating the output frame N' (e.g., N'=8), the information from multiple intermediate interpolated frames (e.g., (1,1), (1,2), (1,3) etc.) are taken by the electronic device (100). In case of the frame N'=8, the frame N'=8 consists of outputs from frames (2,3) and (4,2). Here, a section of frame belonging to ball is taken from (2,3) and a section of frame belonging to the human is taken from (4,2). The rest of the background remains the same. The electronic device (100) further uses frames until N=4 from the input frames to output sectional component of output frame (i.e., last output frame N'=11 takes sections from (3,2) that uses information from input frames N=3 and N=4) and (6,0). Therefore, in the output video, the ball is not touching the goalpost. The output frame of the sectional slow motioned video includes different sections of objects at different interpolation rates belonging to different instances of time, which is the desired effect.

Figure 16:
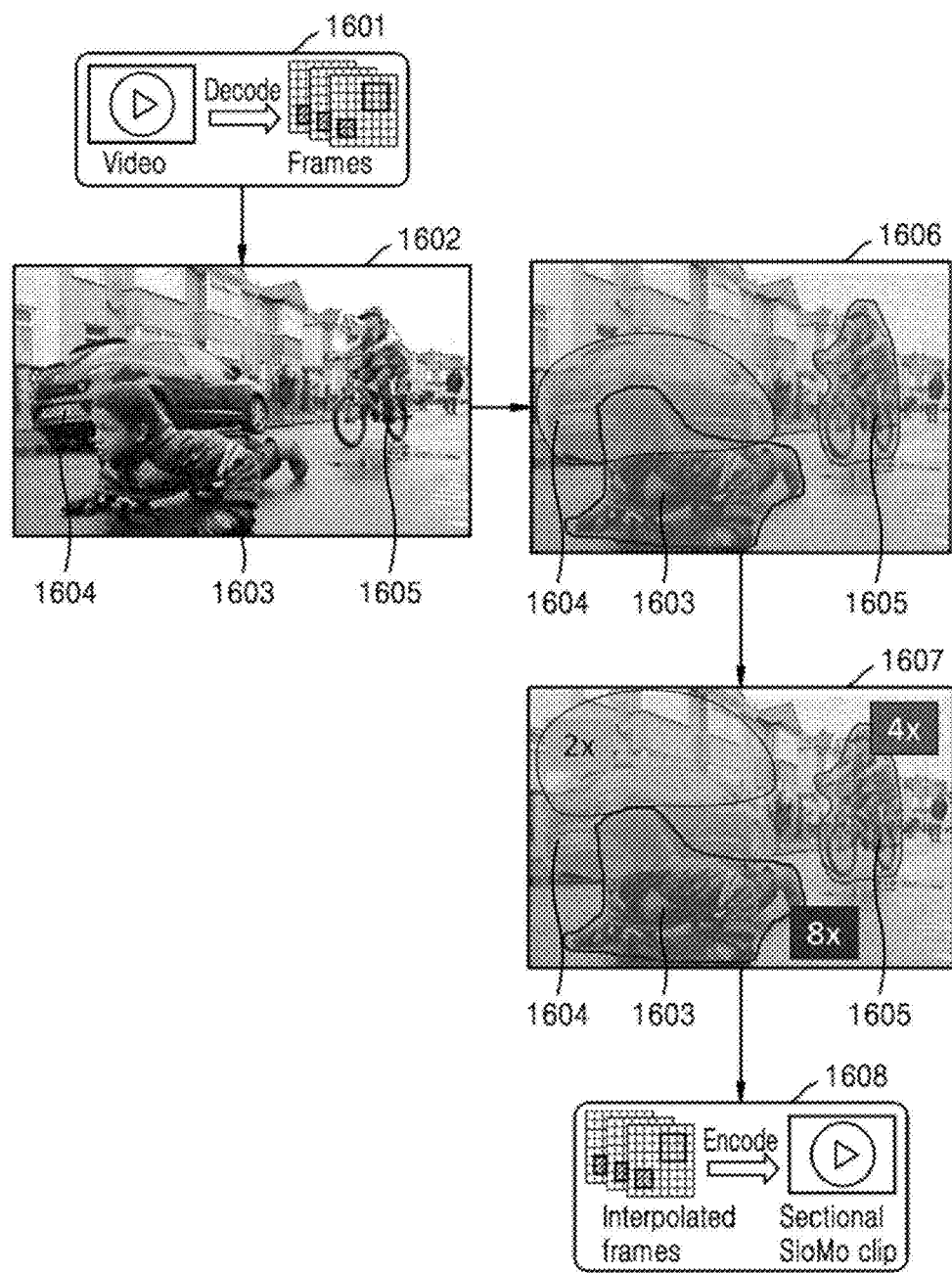
FIG. 16 illustrates an example scenario of generating the multiple sectional slow motion effects in the video, according to an embodiment.

FIG. 16 illustrates an example scenario of generating the multiple sectional slow motion effects in the video, according to an embodiment. Consider, a video of a street is recorded by the electronic device (100). At 1601, the electronic device (100) decodes the video to multiple video frames and filters out the best video frames. At 1602, the electronic device (100) selects a video frame from the filtered video frames, where the video frame illustrates a scene in the street. A car (1604) is moving faster, a boy (1605) is cycling with a medium speed, and a kid (1603) is moving forward slowly with a skateboard are the objects and the motion information of the objects in the scene. At 1606, the electronic device (100) segments the objects (1603-1605) in the video frame and clusters the segmented objects based on the interaction between the segmented objects.

At 1607, the electronic device (100) assigns a significance score to each of the segmented objects and each section of the video frame is made to have a different sectional flow rate based on the significance score of each section. In the example, the electronic device (100) sets the interpolation rate of the car (1604), the boy (1605) and the kid as 2×, 4× and 8× respectively. Since the kid (1603) with the skateboard is in the front portion of the video at relatively lesser depth and is also looking aesthetically pleasing to the human eye, the electronic device (100) sets the interpolation rate of the kid (1603) as 8×. Since the boy (1605) with cycle is in the rear or at much larger depth and not in focus hence intuitively it is of lesser importance, the electronic device (100) sets the interpolation rate of the boy (1605) as 4×. Since, the car (1604) in this video is moving at much slower rate, the electronic device (100) sets the interpolation rate of the car (1604) as 2×. At 1608, the electronic device (100) interpolates the sections of the video containing the objects (1603-1605) according to the interpolation rate of the objects (1603-1605). Further, the electronic device (100) generates the sectional slow motion video clip by encoding the interpolated video frames.

Figure 17:
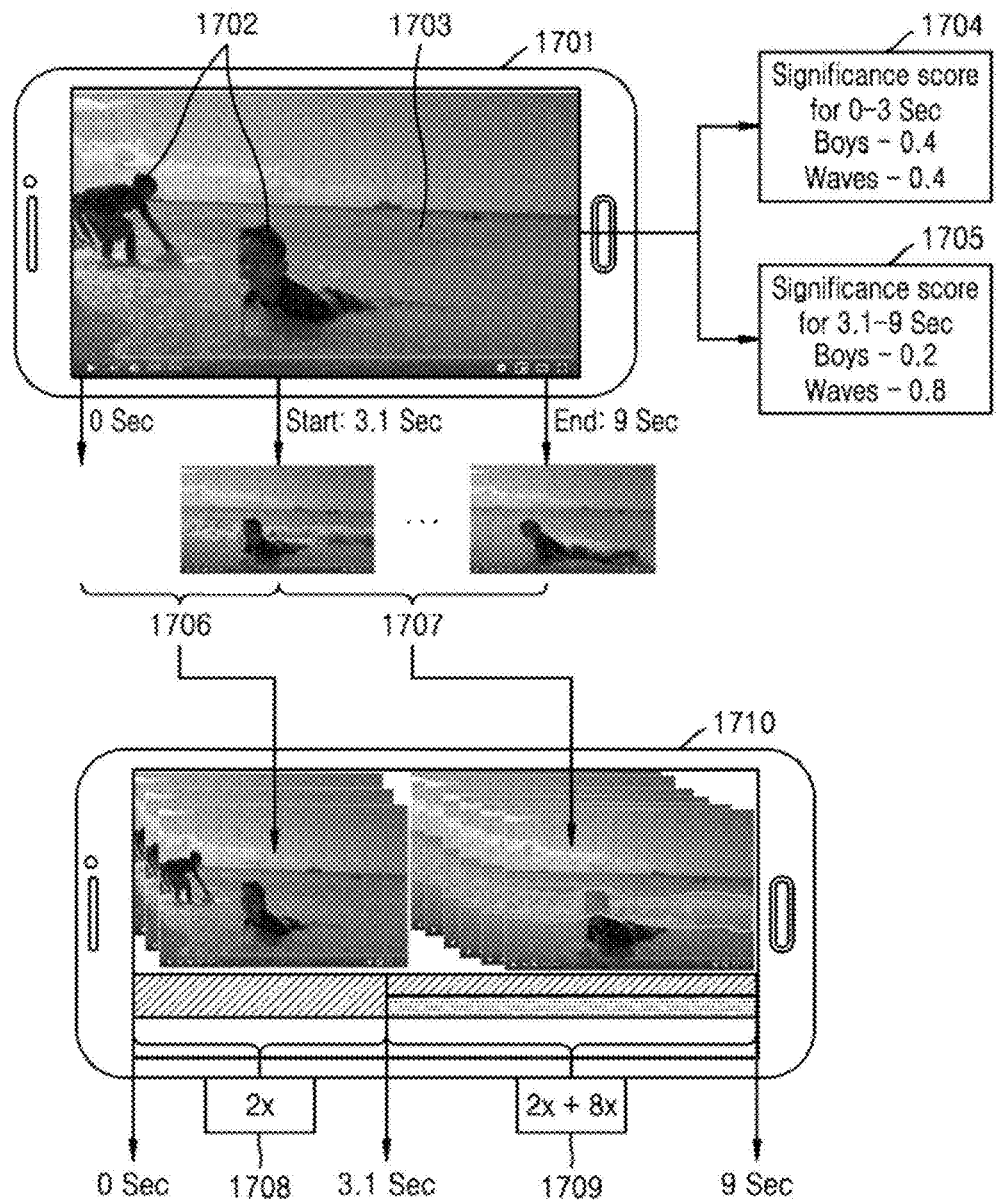
FIG. 17 illustrates an example scenario of generating the multiple sectional slow motion effects for a specific duration in the video, according to an embodiment.

FIG. 17 illustrates an example scenario of generating the multiple sectional slow motion effects for a specific duration in the video, according to an embodiment. At 1701, consider a video of a boys (1702) playing with waves (1703) at a beach is recorded by the electronic device (100). In response to detecting the video, the electronic device (100) decodes the video to multiple video frames. Further, the electronic device (100) determines a start point and an end point for the sectional slow motion video based on a content information and relative flow rate of objects (i.e., boys (1702) and waves (703)) in the video frames. The electronic device (100) determines the significant score of the objects in each frame.

For the first 3 seconds (1706) of the video, the electronic device (100) predicts same significance score (1704) for the wave and the boys. At 1710, hence the electronic device (100) selects a uniform video frame interpolation at 2× (1708) for the first 3 seconds of the video. For a subsequent section (1707) of the video starts from the 3.1 second (i.e., at second 3.1) and ends on the 9th second (i.e., at second 9) of the video, the electronic device (100) predicts different significance scores (1705) for the wave and the boy. At 1710, therefore the electronic device (100) takes the video frames from 3.1 second to 9 second of the video as the start point and the end point of the sectional slow motion video respectively. The significance score of the wave is higher than the significance score of the kids, therefore, the electronic device (100) interpolates the section in the video containing the waves at 8× and the section in the video containing the boys at 2× while generating the sectional slow motion video. Thus, the method according to an embodiment enhances a user experience by automatically identifying the start and end points for the sectional slow motion video from the recorded videos, and producing a sectional slow motion video using the start and end points that are identified.

Figure 18:
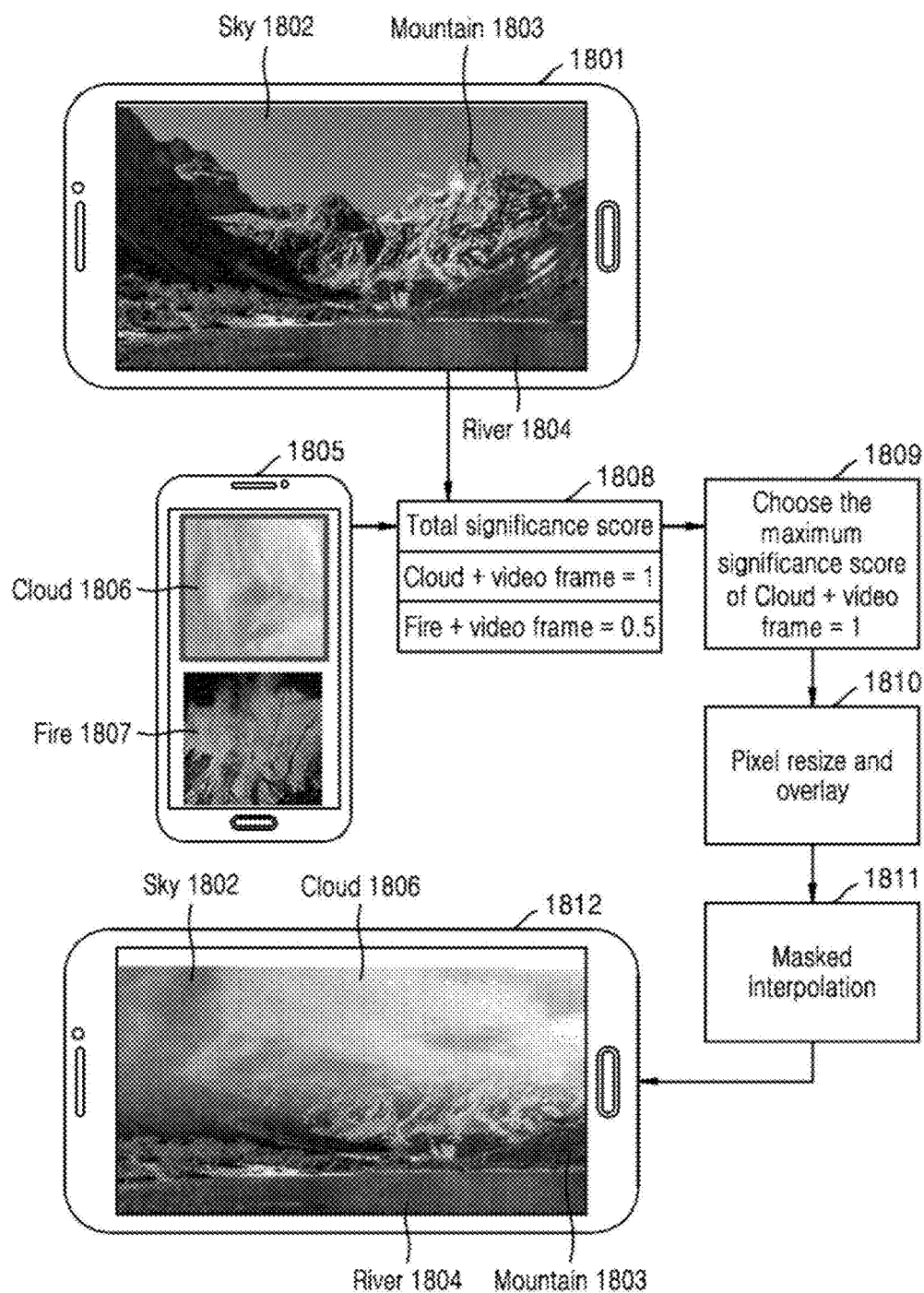
FIG. 18 illustrates an example scenario of selecting an animated clip based on a maximum significance score for generating the multiple sectional slow motion effects for in the video, according to an embodiment.

FIG. 18 illustrates an example scenario of selecting an animated clip based on a maximum significance score for generating the multiple sectional slow motion effects for in the video, according to an embodiment. At 1801, consider the electronic device (100) stores a video of a scenery that includes a river (1804), a mountain (1803) and a sky (1802). The electronic device (100) receives an instruction (e.g., input by a user) to create the slow motion video of the scenery by including an appropriate animated clip in background of the video. In response to receiving the instruction, the electronic device (100) determines the significance score of the video frame of the video of the scenery. At 1805, the electronic device (100) checks for the animated clip present in a repository of the electronic device (100) or in a cloud dataset. Further, the electronic device (100) identifies that the cloud animated clip (1806) and a fire animated clip (1807) are the animated clips present in the repository or the cloud dataset.

At 1808, the electronic device (100) determines a total significance score by adding the significance score of each animated clip with the significance score of the video frame. The electronic device (100) detects that the cloud animated clip (1806) and the video frame together gives a maximum of the total significance score (i.e., 1). At 1809, hence the electronic device (100) chooses the cloud animated clip (1806) to overlay on objects in the video frame. At 1810, the electronic device (100) resizes pixels of the cloud animated clip (1806) and overlays the cloud animated clip (1806) on the scenery in the video. A movement of clouds in the in the cloud animated clip (1806) is relatively less than a movement of the river (1804) in the video. At 1811, the electronic device (100) performs masked interpolation on the cloud animated clip (1806) and the river (1804) by sectionally slow motioned the cloud animated clip (1806) and the river (1804) at different interpolation rates to introduce a cinematographic experience in the slow motion video.

Figure 19:
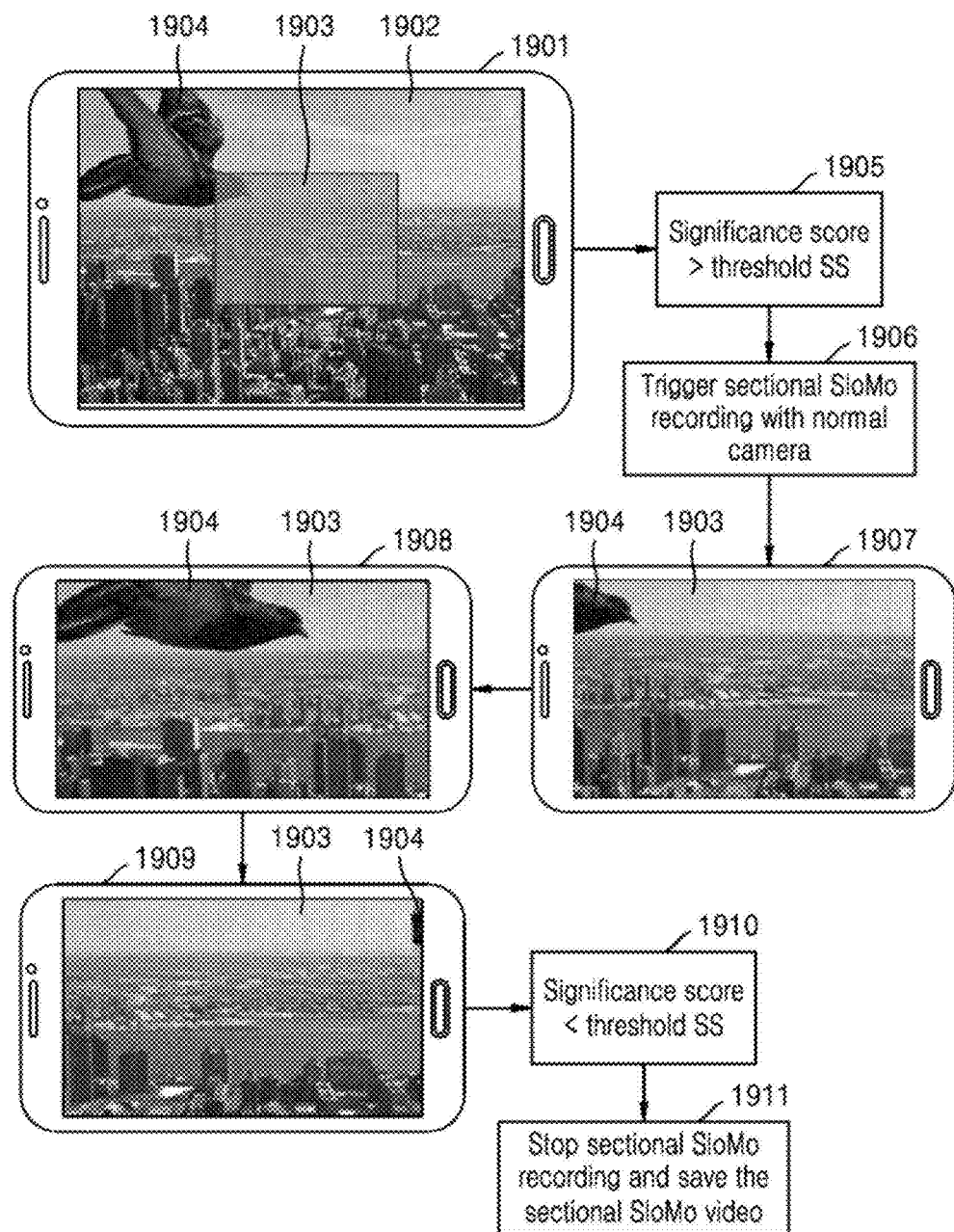
FIG. 19 illustrates an example scenario of early triggering for recording a sectional slow motion video using a multi-camera module, according to an embodiment.

FIG. 19 illustrates an example scenario of early triggering for recording the sectional slow motion video using the multi-camera module, according to an embodiment. At 1901, consider the user is recording wide angle video of a scene includes apartments, a river and clouds using the electronic device (100), where 1902 and 1903 represent a field of view (FOV) of the wide angle camera and the normal (i.e., non-wide angle) camera of the electronic device (100), respectively. Consider, a bird (1904) (i.e., a new object) enters to the FOV of the wide angle camera. The electronic device (100) determines the significance score of the video frame that includes the city and the bird. At 1905, in response to determining that the significance score of the video frame is greater than a threshold significance score, the electronic device (100) prepares to trigger the normal camera for recording the sectional slow motion video once the bird (1904) enters to the FOV of the normal camera.

At 1906, in response to detecting an entry of the bird (1904) to the FOV of the normal camera as shown in 1907, the electronic device (100) triggers the normal camera to record the sectional slow motion video by interpolating a section containing the bird, a section containing the cloud, a section containing the river in the video frames at different interpolation rates based on the significance scores of the bird, the clouds, the river, respectively. The electronic device (100) continuously calculates the significance scores of the objects in video frame and records the sectional slow motion video until the significance scores of the objects in the video frame are below the threshold significance score. At 1908, the bird is still moving in the FOV of the normal camera and hence the significance score of at least one object in the video frame is above the threshold significance score.

At 1909, the bird exits from the FOV of the normal camera and hence the significance scores of the objects in the video frame are lower than the threshold significance score. At 1910, the electronic device (100) detects that the significance scores of the objects in the video frame are lower than the threshold significance score. At 1911, in response to detecting that the significance scores of the objects in the video frame are lower than the threshold significance score, the electronic device (100) stops recording of the sectional slow motion video using the normal camera, and stores the sectional slow motion video to the memory (120).

In an embodiment, the electronic device (100) may pause or stop recording of the video using the wide angle camera in response to detecting that the normal camera starts recording of the sectional slow motion video. Further, in response to detecting that the normal camera stops recording of the sectional slow motion video, the electronic device (100) may resume or start the recording of the video using the wide angle camera. In another embodiment, the electronic device (100) continuously records the video while the normal camera may start or stop recording of the sectional slow motion video.

Values of various parameters mentioned in the example scenarios are given for understanding purposes, which may be different in real world scenarios.

According to a first aspect of an embodiment, there is provided a method for generating multiple sectional slow motion effects in a video, the method comprising segmenting, by an electronic device (100), a plurality of objects in the video; determining, by the electronic device (100), an interaction between the segmented objects; determining, by the electronic device (100), a degree of slow motion effect to be applied to each segmented object in the video based on the interaction and a parameter associated with an importance of a scene in the video; generating, by the electronic device (100), a slow motion video by applying the degree of slow motion effect to that has been determined to corresponding segmented objects; and storing, by the electronic device (100), the slow motion video.

According to a second aspect of an embodiment, the segmenting may comprise determining, by the electronic device (100), a class confidence score of each video frame of the video using a Machine Learning (ML) model, the class confidence score being a quantitative measurement of a quality of content in the video frame; filtering, by the electronic device (100), the video frames based on the class confidence scores; identifying, by the electronic device (100), the plurality of objects in the filtered video frames; estimating, by the electronic device (100), a depth score of each identified object in the filtered video frames based on depth information in the filtered video frames; determining, by the electronic device (100), an optical flow rate of each identified object in the filtered video frames, the optical flow rate being a quantitative measurement of a velocity of movement of pixels corresponding to the identified object in the video; and generating, by the electronic device (100), the segmented objects from the filtered video frames by applying the optical flow rate and the depth score of each identified object to a semantic segmentation network.

According to any of the above aspects of an embodiment, the determining the interaction may comprises determining, by the electronic device (100), the interaction between the segmented objects for a time duration by applying the optical flow rate of each segmented object from the filtered video frames and the depth score of each segmented object to a memory based neural network.

According to any of the above aspects of an embodiment, the determining the degree of slow motion effect may comprise clustering, by the electronic device (100), the segmented objects in each video frame of the video to form object clusters based on the interaction between the segmented objects; determining, by the electronic device (100), a significance score of each object cluster based a change in clustering of the segmented objects at different instants of time in the video and based on the parameter, the significance score being a measure of a relative importance of the object cluster in the video; and determining the degree of slow motion effect for each object based on the significance score for the object cluster which includes the object.

According to any of the above aspects of an embodiment, the determining the significance score of each object cluster may comprise determining, by the electronic device (100), a cluster flow rate ($\alpha$) of each segmented object in the object cluster, the cluster flow rate ($\alpha$) being an average optical flow rate of the segmented objects in the object cluster; generating, by the electronic device (100), a hash table of a proximity change coefficient ($\beta$) based on the change in clustering of the segmented objects at the different instants of time in the video, the proximity change coefficient ($\beta$) being a number of times that the segmented object changes into and out of the object cluster within a time duration; estimating, by the electronic device (100), a rigidness score of each segmented object based on (a) a relative frequency of the objects occurring in the video and (b) a perceptual aesthetic quality of the video frame including the segmented object, the rigidness score being a measure of static aspects of an affinity for slow motion of the segmented object; and determining, by the electronic device (100), the significance score of each object cluster based on the rigidness score (a, b), and based on one or more of the cluster flow rate ($\alpha$) and the proximity change coefficient ($\beta$).

According to any of the above aspects of an embodiment, the generating the slow motion video may comprise determining, by the electronic device (100), an interpolation rate for each of a plurality of sections in the video frames that correspond to the object clusters, based on the significance score of the object cluster corresponding to the section; and interpolating, by the electronic device (100), the object clusters in each video frame based on the interpolation rate of the corresponding sections.

According to any of the above aspects of an embodiment, the electronic device (100) may categorize the segmented objects to one of an interacting class in response to determining the interaction between the segmented objects, and a non-interacting class in response to not determining the interaction between the segmented objects.

According to any of the above aspects of an embodiment, the memory based neural network outputs a probability score indicating whether the segmented objects are interacting.

According to any of the above aspects of an embodiment, the rigidness score may be estimated using a weighted combination of the relative frequency of the objects occurring in the video (a) and the perceptual aesthetic quality of the video frame (b), weights thereof being determined using regression analysis.

According to any of the above aspects of an embodiment, the perceptual aesthetic quality of the video frame (b) may be determined as a probability using a neural network that is trained on a dataset of images labeled with a score of aesthetic values between 0 and 1.

According to a first aspect of another embodiment, there is provided an electronic device (100) for generating multiple sectional slow motion effects in a video, the electronic device (100) comprising a memory (120); a processor (130); and a sectional slow motion controller (110), coupled to the memory (120) and the processor (130), the sectional slow motion controller configured to perform operations comprising segmenting a plurality of objects in the video, determining an interaction between the segmented objects, determining a degree of slow motion effect to be applied to each segmented object in the video based on the interaction and a parameter associated with an importance of a scene in the video, generating a slow motion video by applying the degree of slow motion effect that has been determined to corresponding segmented objects, and storing the slow motion video.

According to a second aspect of another embodiment, the segmenting may comprise determining a class confidence score of each video frame of the video using a Machine Learning (ML) model, the class confidence score being a quantitative measurement of a quality of content in the video frame; filtering the video frames based on the class confidence score; identifying the plurality of objects in the filtered video frames; estimating a depth score of each identified object from the filtered video frames based on depth information of each identified object in the filtered video frames; determining an optical flow rate of each identified object in the filtered video frames, the optical flow rate being a quantitative measurement of a velocity of movement of pixels corresponding to the identified object in the video; and generating the segmented objects from the filtered video frames by applying the optical flow rate and the depth score of each identified object to a semantic segmentation network.

According to any of the above aspects of another embodiment, the determining may comprise determining the interaction between the segmented objects for a time duration by applying the optical flow rate of each segmented object from the filtered video frames and the depth score of each segmented object to a memory based neural network.

According to any of the above aspects of another embodiment, the determining the degree of slow motion effect may comprise clustering the segmented objects in each video frame of the video to form object clusters based on the interaction between the segmented objects; determining a significance score of each object cluster based a change in clustering of the segmented objects at different instants of time in the video and based on the parameter, the significance score being a measure of a relative importance of the object cluster in the video; and determining the degree of slow motion effect for each object based on the significance score for the object cluster which includes the object.

According to any of the above aspects of another embodiment, the determining the significance score may comprise determining a cluster flow rate ($\alpha$) of each segmented object in the object cluster, the cluster flow rate ($\alpha$) being an average optical flow rate of the segmented objects in the object cluster; generating a hash table of a proximity change coefficient ($\beta$) i based on the change in clustering of the segmented objects at the different instants of time in the video, the proximity change coefficient being a number of times that the segmented object changes into and out of the object cluster within a time duration; estimating a rigidness score of each segmented object based on a relative frequency of the objects occurring in the video (a) and a perceptual aesthetic quality of the video frame including the segmented object (b), the rigidness score being a measure of static aspects of an affinity for slow motion of the segmented object; and determining the significance score of each object cluster based on the rigidness score (a, b), and based on one or more of the cluster flow rate ($\alpha$) and the proximity change coefficient ($\beta$).

According to any of the above aspects of another embodiment, the generating the slow motion video may comprise determining an interpolation rate for each of a plurality of sections in the video frames that correspond to the object clusters, based on the significance score of the object cluster corresponding to the section; and interpolating the object cluster in each video frame based on the interpolation rate of the corresponding sections.

According to any of the above aspects of another embodiment, the electronic device (100) may categorize the segmented objects to one of an interacting class in response to determining the interaction between the segmented objects, and a non-interacting class in response to not determining the interaction between the segmented objects.

According to any of the above aspects of another embodiment, the memory based neural network outputs a probability score indicating whether that the segmented objects are interacting.

According to any of the above aspects of another embodiment, the rigidness score is estimated using a weighted combination of the relative frequency of the objects occurring in the video (a) and the perceptual aesthetic quality of the video frame (b), weights thereof being determined using regression analysis.

According to any of the above aspects of another embodiment, the perceptual aesthetic quality of the video frame (b) is determined as a probability using a neural network that is trained on a dataset of images labeled with a score of aesthetic values between 0 and 1.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of various embodiments, those skilled in the art will recognize that the embodiments herein may be practiced with modification within the scope of the embodiments as described herein.

What is claimed is:

1. A method for generating a slow motion video, the method comprising:
   segmenting, by an electronic device, objects in the video;
   determining, by the electronic device, an interaction between the segmented objects;
   clustering, by the electronic device, the segmented objects in the video to generate object clusters based on the interaction;
   determining, by the electronic device, a degree of slow motion effect to be applied to each of the object clusters in the video based on a significance score of each of the object clusters; and
   generating, by the electronic device, the slow motion video by applying the degree of slow motion effect to that has been determined to corresponding the object clusters.

2. The method as claimed in claim 1, wherein the segmenting of the objects in the video comprises:
   determining, by the electronic device, a class confidence score of each video frame of the video using a Machine Learning model, the class confidence score being a quantitative measurement of a quality of content in the video frame;
   filtering, by the electronic device, the video frames based on the class confidence scores;
   identifying, by the electronic device, the objects in the filtered video frames;
   estimating, by the electronic device, a depth score of each of the identified objects in the filtered video frames based on depth information in the filtered video frames;
   determining, by the electronic device, an optical flow rate of each of the identified objects in the filtered video frames, the optical flow rate being a quantitative measurement of a velocity of movement of pixels corresponding to the identified objects in the filtered video frames; and
   generating, by the electronic device, the segmented objects from the filtered video frames by applying the optical flow rate and the depth score of each identified object to a semantic segmentation network.

3. The method as claimed in claim 2, wherein the determining of the interaction comprises:
   determining, by the electronic device, the interaction between the segmented objects for a time duration by applying the optical flow rate and the depth score of each of the segmented objects to a memory based neural network.

4. The method as claimed in claim 3, wherein the determining of the interaction comprises:
   categorizing, by the electronic device, the segmented objects to one of an interacting class in response to determining the interaction between the segmented objects, and a non-interacting class in response to not determining the interaction between the segmented objects.

5. The method as claimed in claim 3, wherein the memory based neural network outputs a probability score indicating whether the segmented objects are interacting.

6. The method as claimed in claim 1, wherein the determining of the degree of slow motion effect comprises:
   determining, by the electronic device, the significance score of each of the object clusters, the significance score being a measure of a relative importance of each of the object clusters in the video; and
   determining the degree of slow motion effect for each of the objects based on the corresponding the significance score for the object clusters.

7. The method as claimed in claim 6, wherein the determining of the significance score comprises:
   determining, by the electronic device, a cluster flow rate of each of the object clusters based on an optical flow rate of each segmented object in the corresponding object clusters;
   generating, by the electronic device, a hash table of a proximity change coefficient $\beta$ based on the change in clustering of the segmented objects at the different instants of time in the video, the proximity change coefficient $\beta$ being a number of times that the segmented object changes into and out of the object clusters within a time duration; and
   determining, by the electronic device, the significance score of each of the object clusters based on based on at least one of the cluster flow rate and the proximity change coefficient $\beta$.

8. The method as claimed in claim 6, wherein the determining of the significance score comprises:
estimating, by the electronic device, a rigidness score of each of the segmented objects based on at least one of a relative frequency of the segmented objects occurring in the video, a perceptual aesthetic quality of the segmented objects and a degree of movement of the segmented objects based on the object classes of the segmented objects, the rigidness score being a measure of static aspects of an affinity for slow motion of the segmented object; and
determining, by the electronic device, the significance score of each of the object clusters based on the rigidness score.

9. The method as claimed in claim 8, wherein the rigidness score is estimated using a weighted combination of the relative frequency of the segmented objects occurring in the video, the perceptual aesthetic quality of the segmented objects, and the degree of movement of the segmented objects based on the object classes of the segmented objects, weights thereof being determined using regression analysis.

10. The method as claimed in claim 8, wherein the perceptual aesthetic quality of the segmented objects is determined as a probability using a neural network that is trained on a dataset of images labeled with a score of aesthetic values between 0 and 1.

11. The method as claimed in claim 6, wherein the generating of the slow motion video comprises:
determining, by the electronic device, an interpolation rate for each of a plurality of sections in the video frames that correspond to the object clusters, based on the significance score of the object cluster corresponding to the section; and
interpolating, by the electronic device, the object clusters in each video frame based on the interpolation rate of the corresponding sections.

12. An electronic device for generating a slow motion video, the electronic device comprising:
a memory;
a processor; and
a sectional slow motion controller, coupled to the memory and the processor, the sectional slow motion controller configured to perform operations comprising:
segmenting objects in the video,
determining an interaction between the segmented objects,
clustering the segmented objects in the video to generate object clusters based on the interaction,
determining a degree of slow motion effect to be applied to each of the object clusters in the video based on a significance score of each of the object clusters,
generating the slow motion video by applying the degree of slow motion effect that has been determined to corresponding the object clusters.

13. The electronic device as claimed in claim 12, wherein the segmenting of the objects comprises:
determining a class confidence score of each video frame of the video using a Machine Learning model, the class confidence score being a quantitative measurement of a quality of content in the video frame;
filtering the video frames based on the class confidence scores;
identifying the objects in the filtered video frames;
estimating a depth score of each of the identified objects in the filtered video frames based on depth information in the filtered video frames;
determining an optical flow rate of each of the identified objects in the filtered video frames, the optical flow rate being a quantitative measurement of a velocity of movement of pixels corresponding to the identified objects in the filtered video frames; and
generating the segmented objects from the filtered video frames by applying the optical flow rate and the depth score of each identified object to a semantic segmentation network.

14. The electronic device as claimed in claim 13, wherein the determining of the interaction comprises:
determining the interaction between the segmented objects for a time duration by applying the optical flow rate and the depth score of each of the segmented objects to a memory based neural network.

15. The electronic device as claimed in claim 14, wherein the determining of the interaction comprises:
categorizing the segmented objects to one of an interacting class in response to determining the interaction between the segmented objects, and a non-interacting class in response to not determining the interaction between the segmented objects.

16. The electronic device as claimed in claim 12, wherein the determining of the degree of slow motion effect comprises:
determining the significance score of each of the object clusters, the significance score being a measure of a relative importance of each of the object clusters in the video; and
determining the degree of slow motion effect for each of the objects based on the corresponding the significance score for the object clusters.

17. The electronic device as claimed in claim 16, wherein the determining of the significance score comprises:
determining a cluster flow rate of each of the object clusters based on an optical flow rate of each segmented object in the corresponding object clusters,
generating a hash table of a proximity change coefficient based on the change in clustering of the segmented objects at the different instants of time in the video, the proximity change coefficient being a number of times that the segmented object changes into and out of the object clusters within a time duration, and
determining the significance score of each of the object clusters based on based on at least one of the cluster flow rate and the proximity change coefficient.

18. The electronic device as claimed in claim 16, wherein the determining of the significance score comprises:
estimating, by the electronic device, a rigidness score of each of the segmented objects based on at least one of a relative frequency of the segmented objects occurring in the video, a perceptual aesthetic quality of the segmented objects and a degree of movement of the segmented objects based on the object classes of the segmented objects, the rigidness score being a measure of static aspects of an affinity for slow motion of the segmented object, and
determining the significance score of each of the object clusters based on the rigidness score.

19. The electronic device as claimed in claim 16, wherein the generating of the slow motion video comprises determining an interpolation rate for each of a plurality of sections in the video frames that correspond to the object clusters, based on the significance score of the object cluster corresponding to the section and interpolating the object clusters in each video frame based on the interpolation rate of the corresponding sections.

20. A non-transitory computer-readable storage medium, having a computer program stored thereon that performs, when executed by a processor, the method according to claim 1.

* * * * *